United States Patent [19]

Tatezono et al.

[11] Patent Number: 5,281,501
[45] Date of Patent: Jan. 25, 1994

[54] METHOD OF RECORDING AND REPRODUCING FOR OPTICAL RECORDING MEDIUM

[75] Inventors: Fumio Tatezono, Osaka; Irie Masahiro, 1-29-4-404 Kasugakouen, Kasuga-shi, Fukuoka-ken; Toshio Tanuma; Toshio Harada, both of Osaka; Koutaro Matsuura, Kyoto, all of Japan

[73] Assignees: Masahiro Irie, Kasuga; Sanyo Electric Co., Ltd., Osaka, both of Japan

[21] Appl. No.: 801,247

[22] Filed: Dec. 3, 1991

[30] Foreign Application Priority Data

Dec. 27, 1990 [JP] Japan .................. 2-408212
Apr. 18, 1991 [JP] Japan .................. 3-86785
Apr. 22, 1991 [JP] Japan .................. 3-90717
Apr. 22, 1991 [JP] Japan .................. 3-90718

[51] Int. Cl.$^5$ .............................. G11B 7/00
[52] U.S. Cl. .......................... 430/21; 430/19; 430/962; 430/945; 430/346; 430/333
[58] Field of Search ............ 430/495, 19, 332, 333, 430/342, 962, 945, 21, 346; 346/135.1

[56] References Cited

U.S. PATENT DOCUMENTS

| 3,715,212 | 2/1973 | Ross ............................ 430/332 |
| 3,918,972 | 11/1975 | Evens et al. .................. 430/962 |
| 4,837,063 | 6/1989 | Irie ............................. 428/64 |
| 4,960,679 | 10/1990 | Nakagiri et al. ............. 430/335 |
| 5,026,619 | 6/1991 | Trundle ........................ 430/19 |

FOREIGN PATENT DOCUMENTS 0306925 3/1989 European Pat. Off. .
0470864 2/1992 European Pat. Off. .

OTHER PUBLICATIONS

Patent Abstracts of Japan, vol. 13, No. 464, Abstract of JP 1-182846, (Jul. 1989).
Patent Abstracts of Japan, vol. 11, No. 42, Abstract of JP 61-211835 (Sep. 1986).
Patent Abstracts of Japan, Vol. 13, No. 279, Abstract of JP 1-067727, (Mar. 1989).
Patent Abstracts of Japan, vol. 14, No. 464, Abstract of JP 2-181746, (Jul. 1990).
English language Abstract of JP 3-192345, Fukuchi, Aug. 1991.
English language Abstract of JP 61-214148, Matsuo et al., Sep. 1986.

Primary Examiner—Charles L. Bowers, Jr.
Assistant Examiner—John A. McPherson
Attorney, Agent, or Firm—Nikaido, Marmelstein, Murray & Oram

[57] ABSTRACT

Disclosed herein is a recording/reproducing method for an optical recording medium comprising a step of heating a recording layer containing a photochromic material and a polymer which are so combined with each other that a photostationary state attained upon irradiation with light of a specific wavelength is varied with temperatures, and a step of applying the light of a specific wavelength to the heated recording layer for bringing the same into a photostationary state and recording information. In order to reproduce the information, a portion of the recording layer which is in a photostationary state is selectively heated, and reproducing light is applied to reproduce recorded and unrecorded states.

11 Claims, 46 Drawing Sheets n : INTEGER

FIG. 4

| SAMPLE No. | PHOTOCHROMIC MATERIAL (g) | PMA (g) | MIXING RATIO OF PHOTOCHROMIC MATERIAL TO PMA (wt %) |
|---|---|---|---|
| A-1 | 0.5 | 10 | 5 |
| A-2 | 0.1 | 10 | 1 |
| A-3 | 0.05 | 10 | 0.5 | n : INTEGER

FIG. 14

| SAMPLE No. | PHOTOCHROMIC MATERIAL(g) | PS(g) | MIXING RATIO OF PHOTOCHROMIC MATERIAL TO PS (wt%) |
|---|---|---|---|
| B-1 | 1.0 | 2 | 50 |
| B-2 | 1.2 | 3 | 40 |
| B-3 | 1.5 | 5 | 30 |
| B-4 | 1.6 | 8 | 20 |
| B-5 | 1.0 | 10 | 10 |
| B-6 | 1.0 | 20 | 5 |
| B-7 | 0.4 | 40 | 1 |
| B-8 | 0.3 | 60 | 0.5 | n, m : INTEGER

FIG. 20

| SAMPLE No. | PHOTOCHROMIC MATERIAL (g) | SMMA (g) | MIXING RATIO OF PHOTOCHROMIC MATERIAL TO SMMA (wt %) |
|---|---|---|---|
| C-1 | 1.0 | 2 | 50 |
| C-2 | 1.5 | 5 | 30 |
| C-3 | 1.0 | 10 | 10 |
| C-4 | 1.0 | 20 | 5 |
| C-5 | 0.4 | 40 | 1 |
| C-6 | 0.3 | 60 | 0.5 | n: INTEGER

| SAMPLE No. | PHOTOCHROMIC COMPOUND (g) | PS (g) | MIXING RATIO OF PHOTOCHROMIC MATERIAL TO PC(wt%) |
|---|---|---|---|
| D-1 | 1.0 | 2.0 | 50 |
| D-2 | 0.75 | 2.5 | 30 |
| D-3 | 0.5 | 5.0 | 10 |
| D-4 | 0.333 | 6.667 | 5 |
| D-5 | 1.0 | 10.0 | 1 |
| D-6 | 0.067 | 13.333 | 0.5 |

(A)  (B)

| SAMPLE No. | PHOTOCHROMIC COMPOUND (g) | PS (g) | MIXING RATIO OF PHOTOCHROMIC MATERIAL TO PS(wt%) |
|---|---|---|---|
| E-1 | 1 | 2 | 50 |
| E-2 | 1.5 | 5 | 30 |
| E-3 | 1.0 | 10 | 10 |
| E-4 | 1.0 | 20 | 5 |
| E-5 | 0.4 | 40 | 1 |
| E-6 | 0.3 | 60 | 0.5 |

FIG. 30
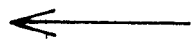
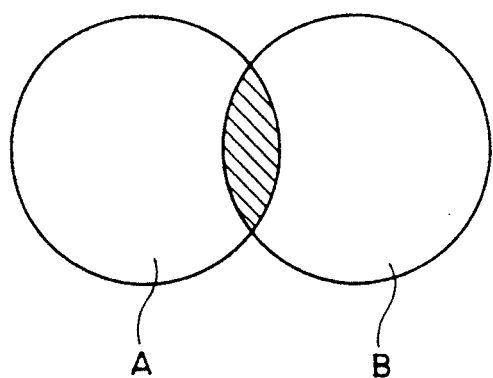

FIG. 41

| SAMPLE NO. | PHOTOCHROMIC MATERIAL (g) | PSt (g) | MIXING RATIO OF PHOTOCHROMIC MATERIAL TO PSt (wt%) |
|---|---|---|---|
| F-1 | 2 | 40 | 5 |
| F-2 | 0.4 | 40 | 1 |
| F-3 | 0.2 | 40 | 0.5 |

FIG.44

| SAMPLE NO. | PHOTOCHROMIC MATERIAL (g) | PVB (g) | MIXING RATIO OF PHOTOCHROMIC MATERIAL TO PVB (wt%) |
|---|---|---|---|
| G-1 | 0.2 | 20 | 1 |
| G-2 | 0.1 | 20 | 0.5 |

FIG.46

| SAMPLE NO. | PHOTOCHROMIC MATERIAL (g) | PMA (g) | MIXING RATIO OF PHOTOCHROMIC MATERIAL TO PMA (wt%) |
|---|---|---|---|
| H-1 | 0.1 | 10 | 1 |

METHOD OF RECORDING AND REPRODUCING FOR OPTICAL RECORDING MEDIUM

BACKGROUND OF THE INVENTION

1. Field of the Invention

The present invention relates to a recording/reproducing method for an optical recording medium containing a photochromic material.

2. Description of the Background Art

In recent years, study has been widely made for applying a photochromic material to a recording layer of a recording medium.

When a photochromic material is irradiated with light of a prescribed wavelength, structures of molecules are changed by photochemical reaction and optical properties such as absorbance, optical rotatory power, reflectance and the refractive index are changed in response to the structural change of the molecules.

When the photochromic material is thereafter irradiated with light of a specific wavelength, the changed molecules are returned to the original structures. Therefore, it is possible to record and reproduce information through difference of the optical properties. Further, it is also possible to erase the information by returning the molecules to the original structures.

For example, Japanese Magazine "Bull Chem. Soc. Jpn" 1990, Vol. 163, pp. 1311 to 1315 discloses a 2,3-bis(2-methyl-benzo[b]thiophene-3-yl) maleic anhydride as such a photochromic material When light of about 430 nm in wavelength is applied, for example, this photochromic material is changed to such a photostationary state that molecules of ring-opening and ring-closing states are mixed with each other, and colored red. When light of about 550 nm in wavelength is applied, on the other hand, the photochromic material is fully changed to a ring-opening state.

Thus, such reversibly changed two states can be made to correspond to recorded and erased states respectively. In order to read out recorded information, light having a specific wavelength of 550 nm, for example, may be applied to this photochromic material for detecting difference of optical properties, such as absorbance, between the two states.

However, when the photostationary state of such a photochromic material is used as a recorded state and the ring-opening state is used as an erased state, for example, the photochromic material enters a ring-opening state and recorded information is destroyed if reproducing light of about 550 nm in wavelength is applied thereto When reproducing light of about 430 nm in wavelength is applied, on the other hand, a portion of an unrecorded state (erased state) of the optical recording medium enters a photostationary state (recorded state) to allow erroneous recording, leading to destruction of original information.

Also when the recorded and erased states are reversed, information is destroyed in reproduction.

In relation to such a recording medium, known is a method of recording information not at only two levels of recording bits of "0" and "1" but at multiple levels. For example, Japanese Patent Laying-Open Nos. 61-211835 (1986), 62-164590 (1987) and 1-182846 (1989) disclose such multilevel recording methods In each of such conventional multilevel recording methods, photochemical reaction is facilitated in proportion to the amount of photons (amount of irradiation of light) to change absorbance etc. in proportion to such facilitation of the reaction. The amount of irradiation of light is gradually set in order to record information at multiple levels.

However, when optical properties such as light absorption of an optical recording medium containing such a photochromic material are detected by reproducing light for reproducing information, structures of molecules are changed by the reproducing light to destroy the original information. Thus, it is also difficult to reproduce information recorded at multiple levels, similarly to the above.

When information is recorded or reproduced in or from an optical recording medium containing such a photochromic material, information recording density depends on a spot diameter D of light which is used for recording or reproduction. With respect to a wavelength $\lambda$ of the light and a numerical aperture NA of an objective lens, the spot diameter D has a relation expressed as $D \propto \lambda/NA$. Therefore, it is necessary to increase the numerical aperture NA for reducing the spot diameter D. In order to increase the numerical aperture, however, it is also necessary to increase the size of the objective lens, and hence the apparatus is increased in size and the cost therefor is remarkably increased.

Further, an optical recording medium employing such a photochromic material is desired to have sensitivity to a band of longer wavelengths.

In addition, such a photochromic material generates a by-product upon irradiation with light. Thus, the material is gradually deteriorated when the same is repeatedly subjected to recording and erasing, to finally cause no reaction. This is conceivably because singlet oxygen is formed by irradiation of light, to oxidize/deteriorate the photochromic material.

It has been reported that, among various photochromic materials, a diarylethene derivative exhibits excellent repetition durability, while a 2,3-bis(2-methylbenzo[b]thiophene-3-yl) maleic anhydride exhibits durability against repetition of $10^3$ to $10^4$ times However, repetition durability of such order is still insufficient in practice

SUMMARY OF THE INVENTION

An object of the present invention is to provide an optical recording medium having an excellent C-N property, which can perform a nondestructive readout operation for reproducing information, and a recording-/reproducing method therefor.

Another object of the present invention is to provide a multilevel recording/reproducing method using an optical recording medium containing a photochromic material.

Still another object of the present invention is to provide a method of recording/reproducing information in high density using an optical recording medium containing a photochromic material.

A further object of the present invention is to provide an optical recording medium having sensitivity to a band of long wavelengths, which can perform a nondestructive readout operation for reproducing information, and a recording/reproducing method therefor.

A further object of the present invention is to improve repetition durability of an optical recording medium containing a photochromic material.

An optical recording medium according to the present invention comprises a recording layer containing a photochromic material and a polymer, which are so combined with each other that a photostationary state attained upon irradiation with light of a specific wavelength is varied with temperatures, a reflective layer for reflecting light being passed through the recording layer, and a substrate for supporting a laminate of the recording layer and the reflective layer.

According to a preferred embodiment of the present invention, the photochromic material is thermally stable and the polymer has strong intermolecular interaction with the photochromic material. Such a photochromic material is made of a diarylethene derivative.

According to the present invention, the photochromic material is preferably made of a diarylethene derivative which has at least one benzothiophene ring. Such a diarylethene derivative is prepared from a 2,3-bis(2-methyl-benzo[b]thiophene-3-yl) maleic anhydride, for example.

The polymer which is combined with the diarylethene derivative to exhibit temperature dependency is prepared from an ion-dissociative material In particular, the polymer is preferably prepared from polymethacrylic acid, for example, having a carboxylic acid group.

As to the combination of the photochromic material and the polymer exhibiting temperature dependency, the conversion from the open-ring form to the closed ring one in the photostationary state at 140° C. is preferably at least twice that at the ordinary temperature.

A photochromic material employable in the present invention may alternatively be made of a diarylethene derivative having an indole ring and a thiophene ring. Such a diarylethene derivative is prepared from 2-(1,2-dimethyl-3-indolyl)-3-(2,4,5-trimethyl-3-thienyl) maleic anhydride.

The polymer which is combined with this diarylethene derivative to exhibit temperature dependency is prepared from polystyrene, polyvinyl butyral or the like.

In order to obtain an optical recording medium which has an excellent C-N property, the mixing ratio of the photochromic material to the polymer contained in the recording layer is preferably less than 20 percent by weight. If the polymer has an aryl group, the said mixing ratio is preferably less than 10 percent by weight. Examples of polymers having aryl groups are polystyrene, a styrene-methacrylic acid copolymer and polycarbonate.

When the polymer has an electric dipole which is larger than the aryl group, the mixing ratio is preferably less than 3 percent by weight. An example of such a polymer is polymethacrylic acid.

In order to improve repetition durability of an optical recording medium containing such a photochromic material, the recording layer preferably contains a singlet oxygen quencher.

FIGS. 48 to 50 show exemplary structural formulas of such a singlet oxygen quencher.

According to the present invention, the photochromic material and the polymer may be contained in the recording layer as a mixture. Alternatively, the photochromic material may be contained as a side chain of the polymer.

A recording method according to the present invention comprises a step of heating a recording layer containing a photochromic material and a polymer which are so combined with each other that a photostationary state attained upon irradiation with light of a specific wavelength is varied with temperatures, and a step of applying the light of the specific wavelength to the heated recording layer for bringing the same into a photostationary state.

The heating step may be carried out by applying the light of a specific wavelength to the recording layer. Alternatively, this step may be carried out by applying another light of another wavelength to the recording layer.

A reproducing method for an optical recording medium according to the present invention comprises a step of selectively heating a portion of a recording layer which is in a photostationary state, a step of applying reproducing light to the recording layer, and a step of detecting the reproducing light being passed through the recording layer for reproducing recorded and unrecorded states.

The heating step is preferably carried out by applying light of a wavelength which is absorbed only by the portion of the recording layer being in the photostationary state.

Preferably the reproducing light is applied to such a heated portion of the recording layer to maintain the photostationary state of the portion of the recording layer. Thus, a nondestructive readout operation can be performed.

A multilevel recording method according to the present invention comprises a step of heating a recording layer containing a photochromic material and a polymer, which are so combined with each other that a photostationary state attained upon irradiation with light of a specific wavelength is varied with temperatures, to a temperature corresponding to each level, and a step of applying light of the specific wavelength to the heated recording layer to bring the same into a photostationary state corresponding to the temperature.

The heating step preferably comprises a step of changing the amount of irradiation of the light of a specific wavelength for heating the recording layer to the temperature corresponding to each level.

A multilevel reproducing method according to the present invention comprises a step of selectively heating a portion which is in a photostationary state corresponding to each level to a temperature corresponding to each level, a step of applying reproducing light to a recording layer, and a step of detecting the reproducing light being passed through the recording layer for reproducing recorded and unrecorded states at each level.

In this multilevel reproducing method, the heating step preferably comprises a step of applying light of a wavelength which is absorbed only by the portion of the recording layer being in a photostationary state for heating the same. The reproducing light is preferably applied to the portion of the recording layer heated to the temperature corresponding to each level, so that the portion of the recording layer is maintained in a photostationary state corresponding to each level.

A high density recording/reproducing method according to the present invention comprises a step of applying heating light to a part of a recording layer containing a photochromic material and a polymer which are so combined with each other that a photostationary state attained upon irradiation with light of a specific wavelength is varied with temperatures for heating the same, and a step of applying light of the specific wavelength to be partially overlapped with a region of the heated part of the recording layer for performing recording/reproduction.

Another high density recording/reproducing method according to the present invention comprises a step of applying heating light to a recording layer containing a photochromic material and a polymer which are so combined with each other that a photostationary state attained upon irradiation with light of a specific wavelength is varied with temperatures for heating the same, and a step of applying light of the specific wavelength to the recording layer with relative movement following the heating light for recording/reproducing the part of the recording layer heated by the heating light.

According to each of the inventive high density recording/reproducing method, it is possible to cause photochemical reaction only in a part of a light spot, so that recording/reproduction can be made in a region smaller than the spot diameter. Thus, information can be recorded/reproduced in high density, while the same can be reproduced at a high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates mixing ratios of photochromic materials to polymers contained in recording layers in Example 1 of the present invention;

FIG. 14 illustrates mixing ratios of photochromic materials to polymers contained in recording layers in Example 2 of the present invention;

FIG. 20 illustrates mixing ratios of photochromic materials to polymers contained in recording layers of Example 3 of the present invention;

FIG. 30 illustrates exemplary spots of heating light and light of a specific wavelength applied to an optical recording medium according to the present invention;

FIG. 41 illustrates mixing ratios of photochromic materials to polystyrene contained in recording layers in Example 6 of the present invention;

FIG. 44 illustrates mixing ratios of photochromic materials to polyvinyl butyral contained in recording layers in Example 7 of the present invention;

FIG. 46 illustrates a mixing ratio of the photochromic material shown in FIG. 39 to polymethacrylic acid;

DESCRIPTION OF THE PREFERRED EMBODIMENTS

Figure 51:
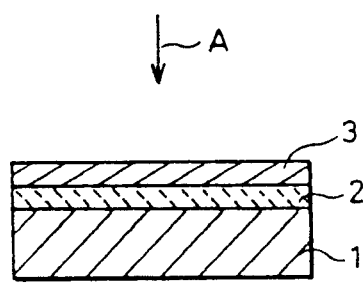
FIG. 51 is a sectional view showing an exemplary optical recording medium according to the present invention.

FIG. 51 shows an optical recording medium according to the present invention. Referring to FIG. 51, a reflective layer 2 is provided on a substrate 1. The reflective layer 2 is provided thereon with a recording layer 3, which contains a photochromic material and a polymer according to the present invention. Light is applied to this optical recording medium from above along arrow A. The light which is passed through the recording layer 3 is reflected by the reflective layer 2, to be again passed through the recording layer 3.

Figure 52:
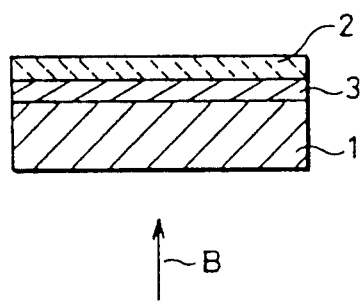
FIG. 52 shows another exemplary optical recording medium according to the present invention.

FIG. 52 shows another optical recording medium according to the present invention. Referring to FIG. 52, a recording layer 3 is provided on a substrate 1, and a reflective layer 2 is provided on the recording layer 3. Light is applied to the optical recording medium along arrow B, and passed through the substrate 1 to enter the recording layer 3. The light thus passed through the recording layer 3 is reflected by the reflective layer 2, to be again passed through the recording layer 3 and the substrate 1.

Figure 1:
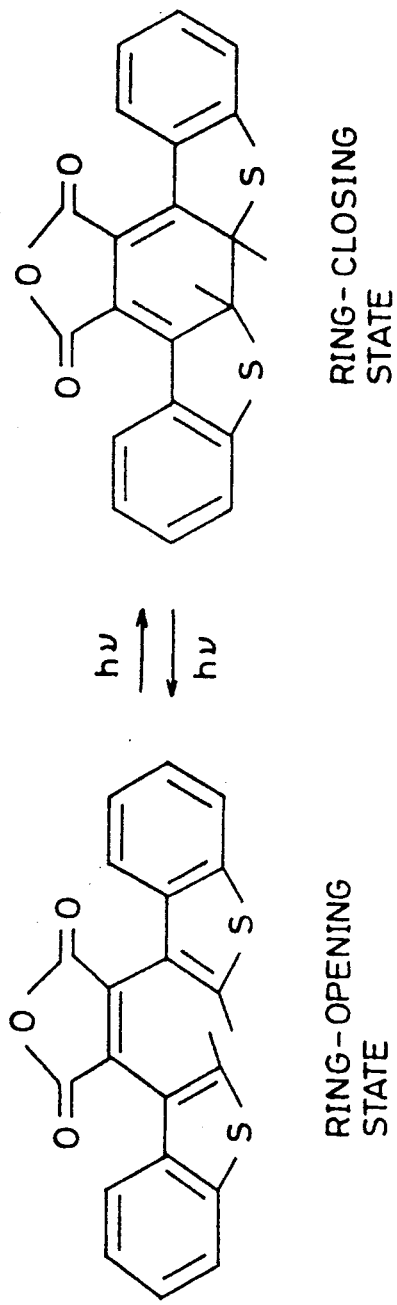
FIG. 1 illustrates the structural formula of a 2,3-bis(2-methyl-benzo[b]thiophene-3-il) maleic anhydride, which is one of photochromic materials employed in the present invention.

A photochromic material to be contained in a recording layer was prepared from a 2,3-bis(2-methylbenzo[b]-thiophene-3-yl) maleic anhydride, which is one of diarylethene derivatives having benzothiophene rings as shown in Japanese Magazine "Bull. Chem. Soc. Jpn." 1990, Vol. 163, pp. 1311-1315. FIG. 1 shows the reaction formula of this photochromic material.

Ring-opening and ring-closing states of this photochromic material are so stable that the same are hardly changed by heat.

First, the photochromic material was dissolved in a solvent of benzene, and the solution was filled in an optical cell, for measurement of absorbance.

Figure 2:
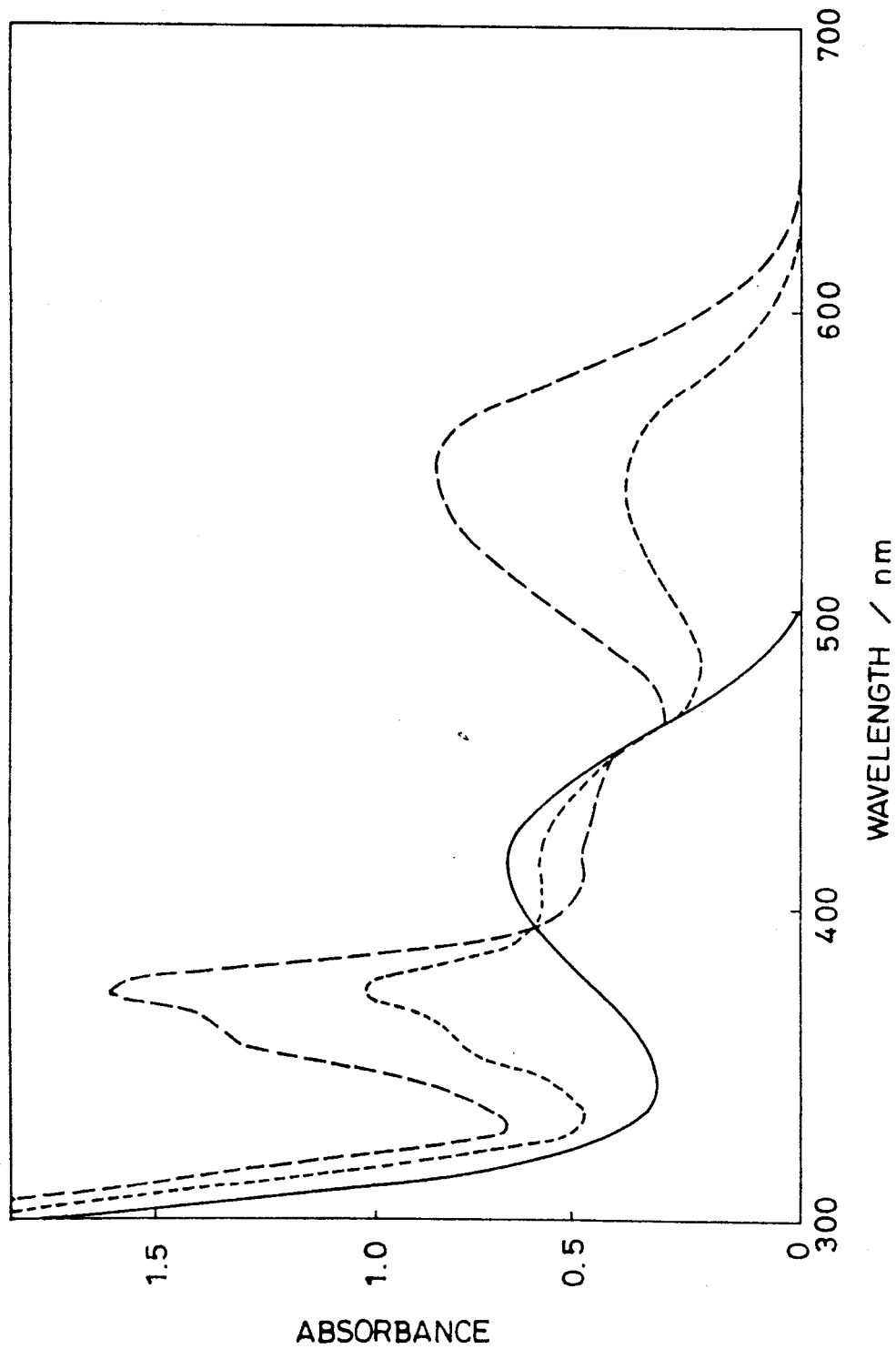
FIG. 2 illustrates absorbance of the photochromic material shown in FIG. 1.

FIG. 2 schematically shows absorbance characteristics of the solution.

First, absorbance was measured when the photochromic material was fully in a ring-closing state. FIG. 2 shows the resultant absorption spectrum with a broken line. For such measurement, the closed-ring form was previously separated through a column.

Then, light of 546 nm in wavelength was applied to this photochromic material to bring the same into a ring-opening state as a whole, for measurement of absorbance.

FIG. 2 shows the resultant absorption spectrum with a solid line. It is assumed here that X represents absorbance at a wavelength of 417 nm.

Then, light of 436 nm, which was outputted from a mercury lamp and passed through a filter, was applied to the solution of the photochromic material to bring the same into a photostationary state, for measurement of absorbance.

FIG. 2 shows the resultant absorption spectrum with a dotted line. It is assumed here that Y represents absorbance at a wavelength of 544 nm.

From the results shown in FIG. 2, it is understood possible to record and reproduce information with respect to the aforementioned photochromic material, since its absorbance is changed around irradiation of light of about 430 nm in wavelength between a ring-opening state and a photostationary state.

In order to attain excellent information recording etc., the photochromic material is preferably changed from a ring-opening state to a ring-closing state in a larger ratio. In other words, optical properties such as absorbance are preferably efficiently changed upon irradiation with the light of about 430 nm in wavelength.

The rate Z of this change can be expressed in a ratio $Y/X$ of the absorbance Y at the wavelength of 544 nm, which is one peak of absorbance in the ring-closing state, to the absorbance X at the wavelength of 417 nm, which is the peak of the absorbance in the ring-opening state. In the case of the above solution, this rate Z of change was 0.58.

Figure 3:
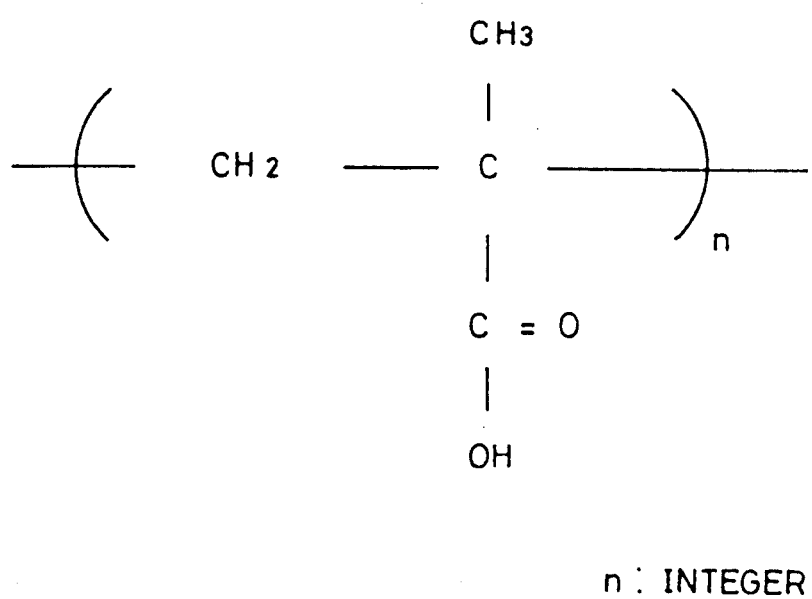
FIG. 3 illustrates the structural formula of polymethacrylic acid.

FIG. 3 shows the structural formula of polymethacrylic acid (hereinafter referred to as PMA) having mean molecular weight of about 20000, which is a polymer having strong intermolecular interaction with the aforementioned photochromic material. The photochromic material and polymethacrylic acid were dissolved in 100 g of methyl cellosolve, serving as a solvent, to prepare solutions of samples Nos. A-1 to A-3 shown in FIG. 4.

The samples Nos. A-1 to A-3, containing the aforementioned photochromic material and polymethacrylic acid, were applied onto glass substrates by spin coating at a speed of 700 r.p.m. Thereafter the solvents were evaporated to form recording media provided with recording layers.

Then, light of 546 nm in wavelength was applied to the recording layers of the recording media, which were made of the samples Nos. A-1 to A-3, from the substrate sides, to bring the photochromic materials contained in the recording layers fully into ring-opening states, for measurement of absorbance values.

The photochromic materials were easily brought into the ring-opening states upon irradiation with the light of 546 nm in wavelength.

Then, light of 436 nm in wavelength was applied to the portions irradiated with the aforementioned light, to bring the photochromic materials into photostationary states, for measurement of absorbance values. The aforementioned rates Z of change were evaluated from the measured absorbance values.

Figure 5:
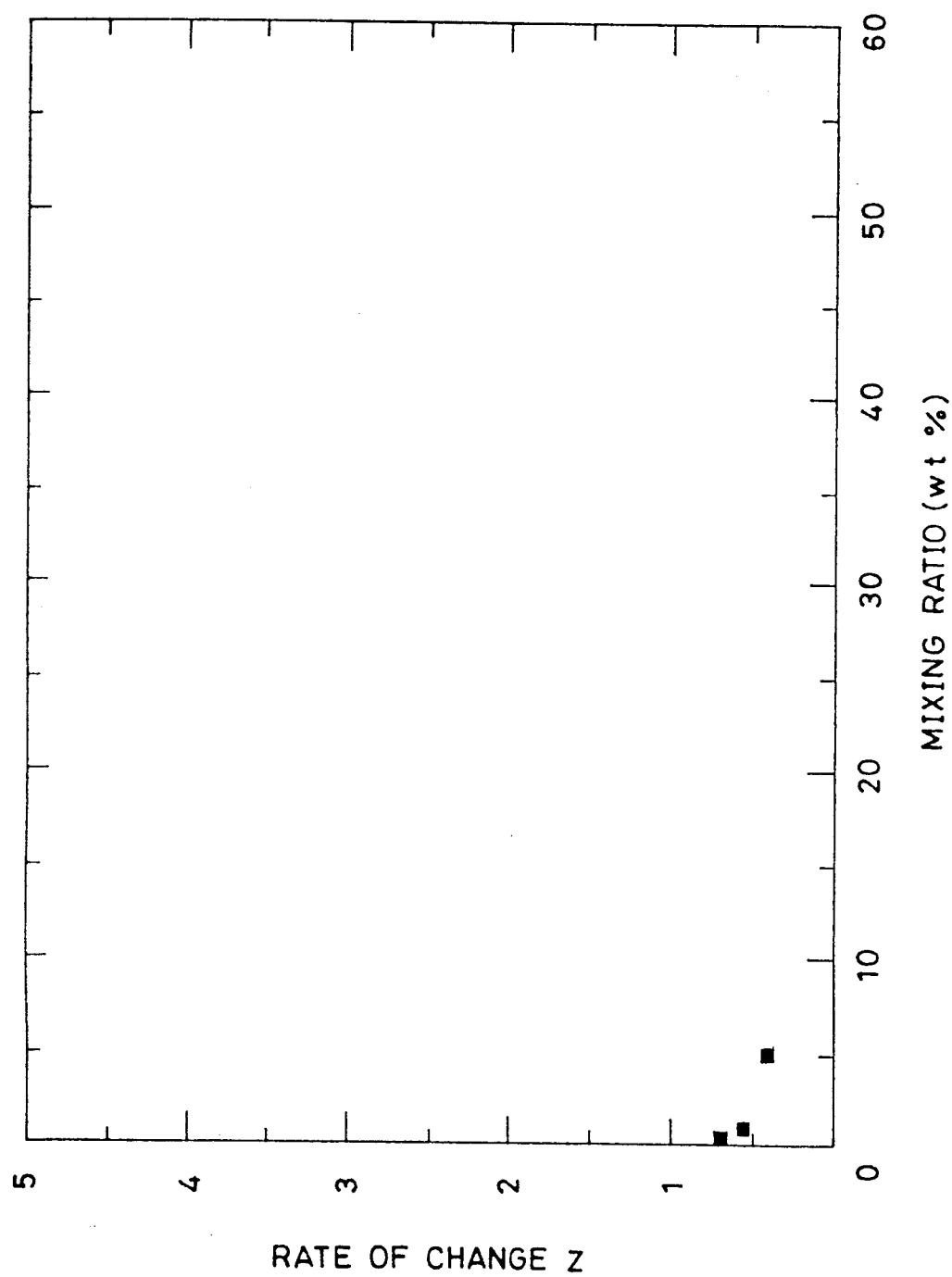
FIG. 5 illustrates relations between rates Z of change from ring-opening states to ring-closing states and mixing ratios in the photochromic materials of Example 1.
Figure 6:
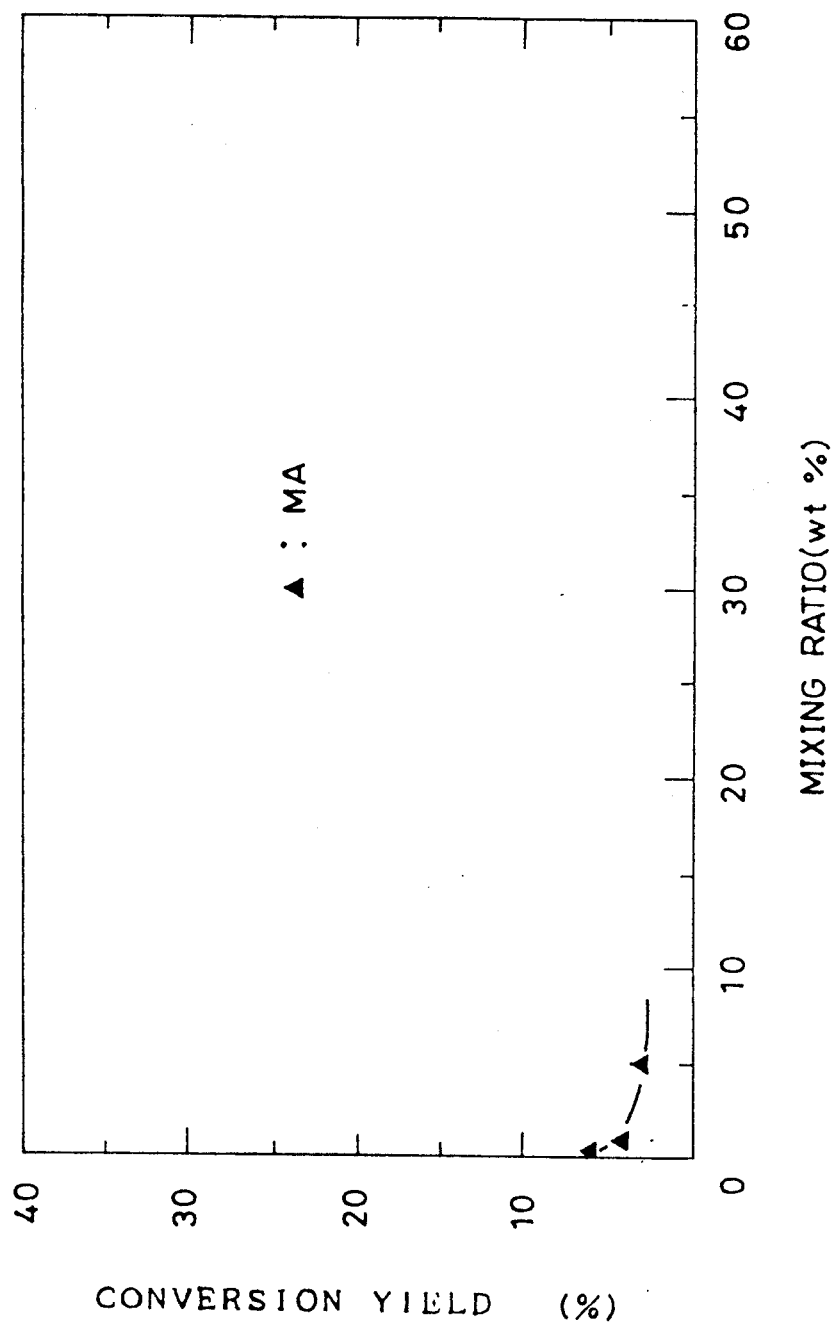
FIG. 6 illustrates relations between conversion yields of ring-closing states converted from ring-opening states and mixing ratios in the photochromic materials in Example 1.

FIG. 5 shows the results. Referring to FIG. 5, the axis of ordinates represents the rates Z of change from ring-opening states to ring-closing states of the photochromic materials. The axis of abscissas represents mixing ratios (wt.%) of the photochromic materials to polymethacrylic acid. Further, FIG. 6 shows relations between formation ratios (%) of the ring-closing states converted from the ring-opening states upon irradiation with the light of 436 nm in wavelength, which were evaluated from the aforementioned rates Z of change, i.e., conversion yields, and the aforementioned mixing ratios (wt.%).

As understood from FIG. 5, the rates Z of change of such optical recording media are extremely smaller as compared with the rates Z of change (=0.58) of the solutions. Namely, it is understood that the photochromic materials which are in ring-opening states are changed to ring-closing states at extremely small rates, as shown in FIG. 6.

In general, it is expected that an optical recording medium which contains a photochromic material in a small mixing ratio to a polymer having small intermolecular interaction with the photochromic material enters a state close to the aforementioned solution state so that the rate Z of change is increased. Referring to FIG. 5, the rate Z of change is increased when the mixing ratio of the photochromic material to polymethacrylic acid is not more than 3 percent by weight.

It is conceived that quantum yields of change from a ring-opening state to a ring-closing state is reduced in the present invention since the polymethacrylic acid employed as the polymer in this example has strong intermolecular interaction with the photochromic material, and hence the rate of change is reduced.

This is because the intermolecular interaction between the polymer and the photochromic material is conceivably increased since hydrogen of a carboxylic acid group contained in the polymethacrylic acid enters a state of ion dissociation or that close to ion dissociation and a large amount of charges are present in carbonyl-bonded oxygen in the carboxyl acid group.

In other words, it is conceived that electrostatic force etc. between the polymer and the photochromic material are increased.

The aforementioned photochromic material makes transition from a ring-opening state to an excited state which is related to a ring-closing state by light of about 430 nm in wavelength, and is thereafter converted to a ring-closing state.

However, it is conceived that a reaction path for the change from the ring-opening state to the ring-closing state is inhibited since the aforementioned strong intermolecular interaction changes at least one of a potential energy curve of the aforementioned excited state or a state related to a ring-closing state, transition probability between the excited state and the state related to a ring-closing state, a potential energy curve which is a ground state of the ring-opening state and the like, and the quantum yields is reduced.

Thus, the change of the photochromic material f-rom the ring-opening state to the ring-closing state is substantially suppressed when the polymer has strong intermolecular interaction with the photochromic material.

This intermolecular interaction can be increased when the polymer and/or the photochromic material has large polarization, polarity, resonance effect and the like, the same is ionized, or the like.

The aforementioned intermolecular interaction causes interaction between molecules, between molecules and ions, and between ions themselves, and produces composite compounds such as molecular compounds when such action is strong.

Then, light of 546 nm in wavelength was applied to the optical recording media containing the samples Nos. A-1 and A-2, to measure absorbance values when the media were placed on a heater which was at a desired temperature and irradiated with light of 436 nm in wavelength, to be brought into photostationary states. When the optical recording media reached the room temperature, absorbance values were measured similarly to the above, for evaluation of temperature dependency values of rates Z of change.

Figure 7:
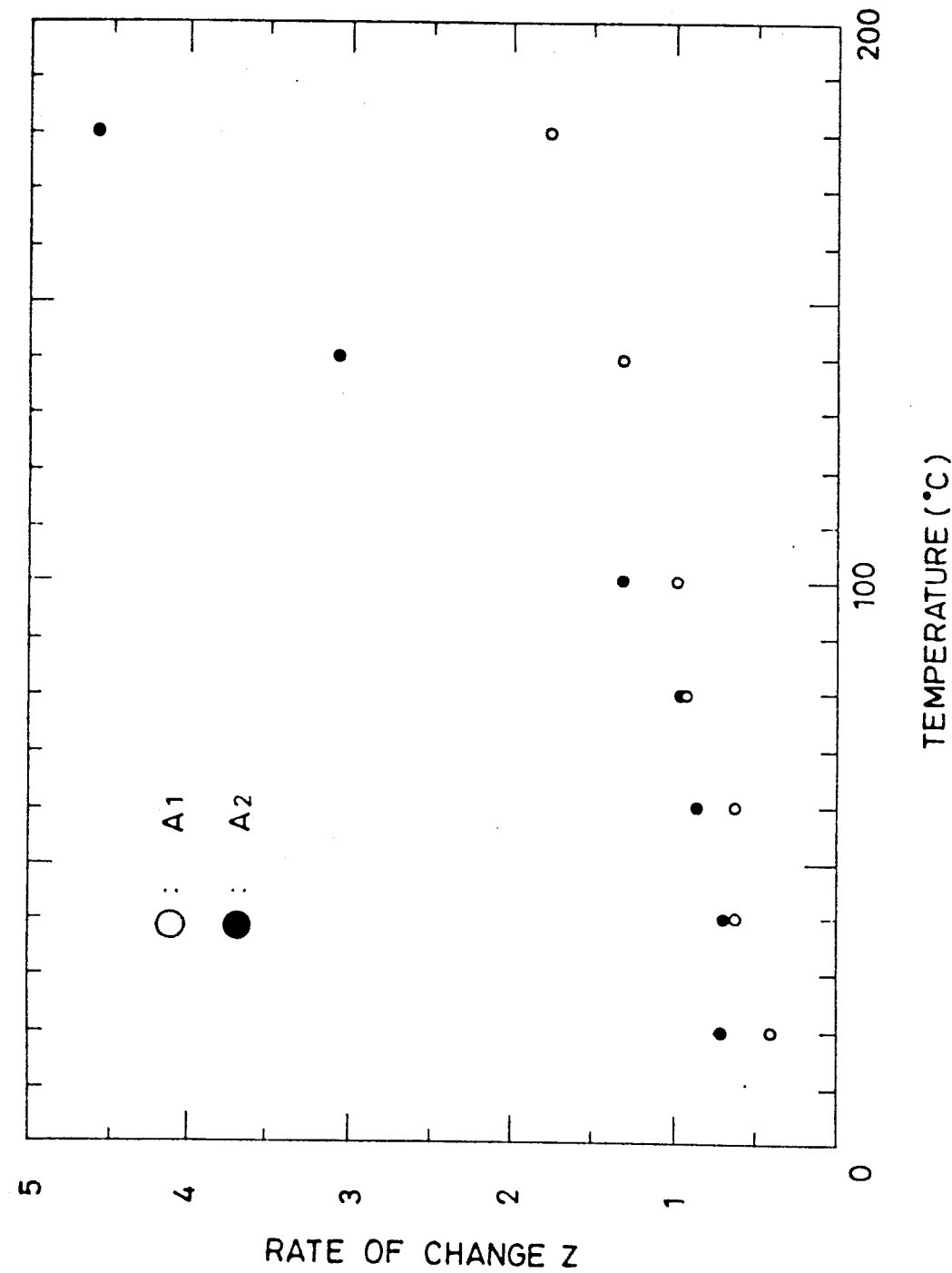
FIG. 7 illustrates temperature dependency values of rates Z of change in Example 1.
Figure 8:
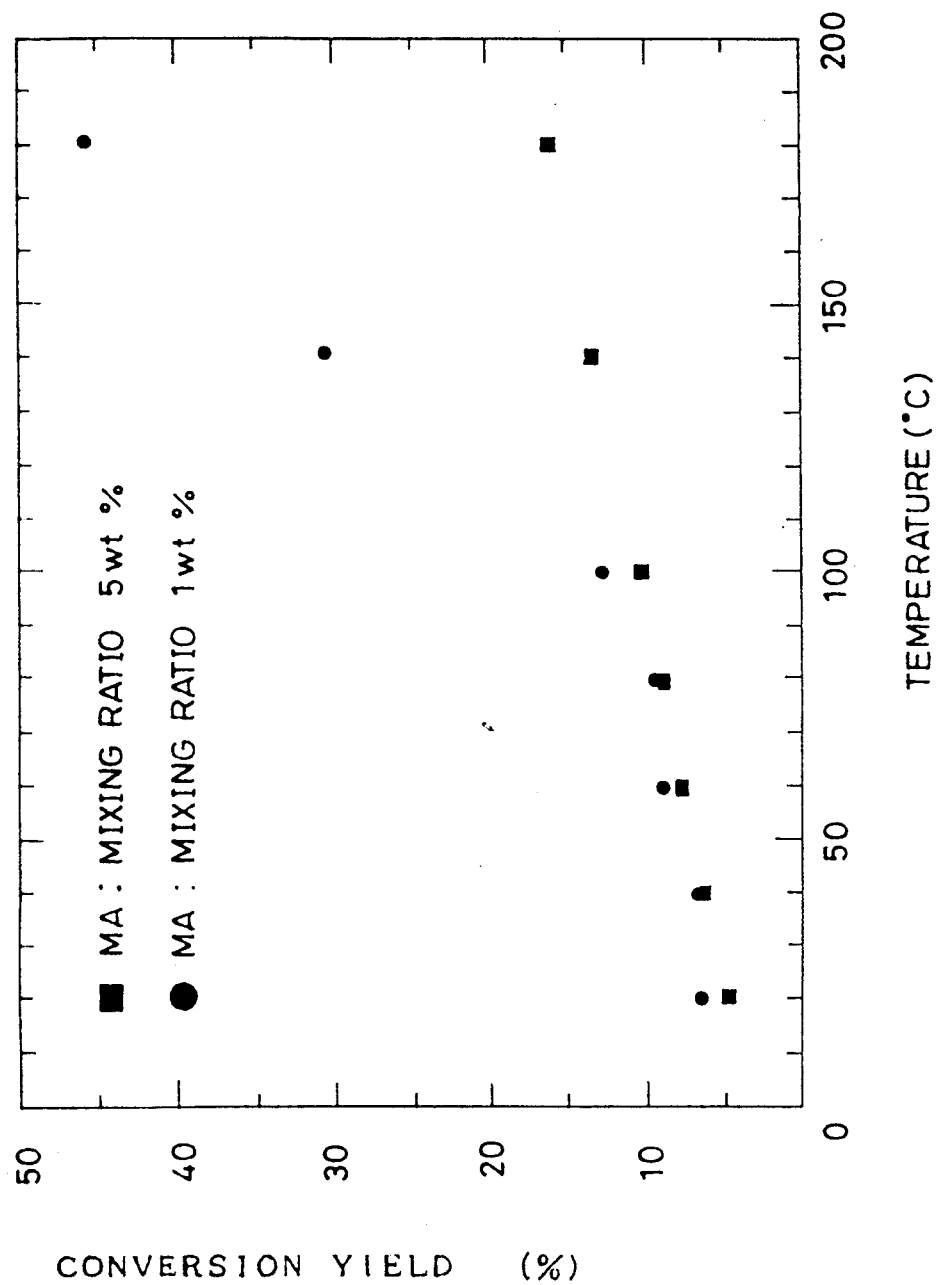
FIG. 8 illustrates temperature dependency values of conversion yields in Example 1.

FIG. 7 shows the results. Referring to FIG. 7, white circles show the results of the optical recording medium containing the sample No. A-1, and the black circles show the results of that containing the sample No. A-2. FIG. 8 shows temperature dependency values of conversion yields (%) of ring-closing states converted from the ring-opening states upon irradiation with the light of 436 nm in wavelength, which were evaluated from the rates Z of change, i.e., conversion yields of closed-ring form.

It is understood from FIG. 7 that the rates Z of change are increased following increase of the temperatures of the optical recording media. Namely, the photochromic molecules are extremely easily changed from ring-opening states to ring-closing states as the temperatures are increased, as understood from FIG. 8.

This can be considered as follows: When the optical recording medium is heated, the environment of the photochromic molecules is so changed that the potential energy curve of the aforementioned excited state or the state related to the ring-closing state, the transition probability between the excited state and the state related to the ring-closing state, the potential energy curve, which is the ground state of the ring-opening state, and the like are brought into states close to those of the solution, and distribution etc. of molecules present at each energy level are changed, whereby transition between the excited state and the state related to the ring-closing state etc. are increased to increase the quantum efficiency of change from the ring-opening state to the ring-closing state.

It is understood from FIGS. 7 and 8 that temperature dependency of the rate of change is increased when the mixing ratio of the photochromic material to the polymer is small.

Thus, it is understood that information may be recorded in the optical recording medium by applying light of 436 nm in wavelength while heating the medium for bringing the photochromic material into a photostationary state, assuming that the ring-opening state is used as an erased state (unrecorded state) and the photostationary state is used as a recorded state, for example.

The information can be reproduced by applying light of 436 nm in wavelength to the medium and detecting change of optical properties such as absorbance with respect to this light. This light preferably has small intensity, not to heat the recording layer.

The information can be easily erased by applying light of 546 nm in wavelength to the recording medium.

According to this method, the photochromic material is easily changed from a ring-opening state to a ring-closing state in recording of information since the recording layer is heated. In reproduction of information, on the other hand, the photochromic material is hardly changed from a ring-opening state to a ring-closing state since the recording layer is not heated.

In erasing of information, the photochromic material is easily changed from a photostationary state to a ring-opening state only with light. Thus, the information can be easily erased.

It is understood that, when the ring-opening state of the optical recording medium is used as a recorded state and the photostationary state is used as an erased state (or unrecorded state), the information may be recorded by applying light of 546 nm in wavelength and bringing the photochromic material into a ring-opening state. At this time, the recording layer may not be heated.

The information can be reproduced by applying light of 436 nm in wavelength and detecting change of optical properties such as absorbance with respect to this light. This light preferably has small intensity, for a reason similar to the above.

The information can be erased by applying light of 436 nm in wavelength while heating the recording layer.

According to this method, information can be easily recorded since the photochromic material is easily changed from a photostationary state to a ring-opening state only with light. In reproduction of information, on the other hand, the photochromic material is hardly changed from a ring-opening state to a ring-closing state since the recording layer is not heated.

In erasing of the information, the photochromic material can be easily changed from a ring-opening state to a photostationary state since the recording layer is heated.

The recording layer can be heated with a laser beam or the like. This laser beam preferably has a long wavelength of 633 nm, for example, in a visible region close to an infrared region, an infrared region, or a near infrared region.

Further, the optical recording medium may be provided with an absorption layer for absorbing the laser beam on a laser beam outgoing side. In the case of a reflection type optical recording medium, for example, such an absorption layer may be provided on a surface of the recording layer for reflecting the laser beam. Also in the case of a transmission type medium, the absorption layer may be provided on the surface of the recording layer for reflecting the laser beam.

A heat holding layer may be provided on a surface of the recording layer or the like.

Alternatively, a laser beam for recording (or erasing) information or the like may be increased in intensity for recording (or erasing) information in (or from) the optical recording medium while heating the recording layer with this laser beam.

In the aforementioned method of reproducing information, however, the recorded information may be destroyed.

Namely, although the photochromic material is hardly changed from a ring-opening state to a ring-closing state when light of 436 nm in wavelength is applied to the optical recording medium with no heating for reproducing information, the same may be changed from a ring-closing state to a ring-opening state at a low rate of change, to be out of a photostationary state.

In order to solve this problem, the following principle may be utilized:

For example, it is assumed here that the ring-opening state of the optical recording medium is used as an erased state and a mixed state or a photostationary state of the photochromic material, which includes ring-opening and ring-closing states, is used as a recorded state and light of 436 nm in wavelength, for example, is used for reproducing information.

If at least a recorded portion, in which information is recorded, of the optical recording medium is heated when the reproducing light is applied to the recorded portion so that the photochromic material is also changed from a ring-opening state to a ring-closing state to balance the change from the ring-opening state to the ring-closing state and reverse change for maintaining the recorded portion in the same absorbance level with that in recording of the information while at least an erased portion, in which no information is recorded, is not heated when the aforementioned light is applied to the erased portion, no information is destroyed since the photochromic material is fully in a ring-opening state in the erased portion and hardly changed from the ring-opening state to a ring-closing state.

The light for heating the recording layer preferably has a long wavelength, since such long-wave light hardly causes chemical reaction in general, and generates heat mainly with non-radiant deactivation.

Figure 9:
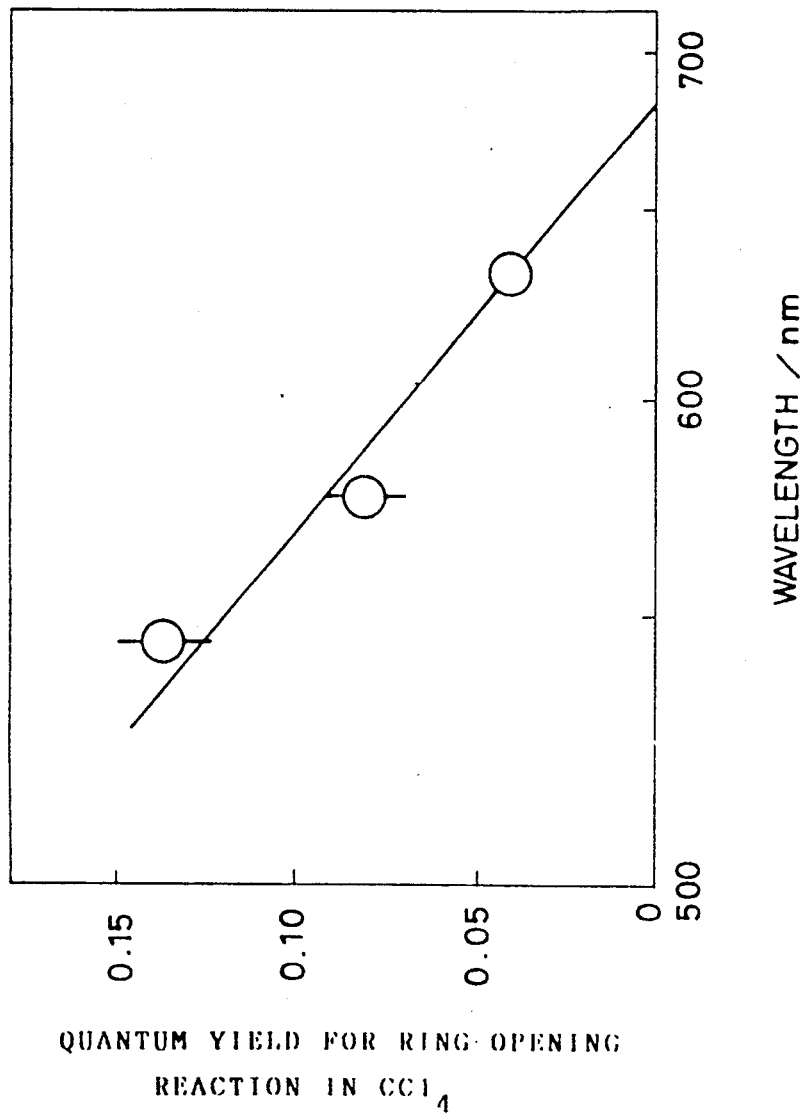
FIG. 9 illustrates wavelength dependency values of quantum yields of photochromic materials.

FIG. 9 illustrates the relation between quantum yield and wavelength dependency of reaction of a 2,3-di(2,3,5-trimethylthienyl) anhydride, which is a diarylethene-based photochromic material, from a ring-closing state to a ring-opening state. From this relation, it is conceived that the photochromic material of this example also exhibits small quantum yield with light of 633 nm in wavelength, for example, and the light is mostly converted to heat.

Thus, it is understood that the light of 633 nm in wavelength, which is applied as heating light, is hardly absorbed in an erased portion of the optical recording medium and generates no heat, whereby it is possible to suppress change from a ring-opening state to a ring-closing state caused by application of the light of 436 nm in wavelength.

On the other hand, a recorded portion of the optical recording medium absorbs the light of 633 nm in wavelength, whereby at least 90% of this light is converted to heat. Thus, it is understood that the photochromic material can also be changed from a ring-opening state to a ring-closing state upon irradiation with light of 436 nm in wavelength.

Therefore, it is possible to perform a nondestructive readout operation by applying the light of 436 nm in wavelength and that of 633 nm in wavelength, for example, and detecting change of optical properties such as absorbance.

Information can be recorded by applying the light of 436 nm in wavelength while appropriately setting the amount of irradiation, intensity, the irradiation time and the like. Information can also be recorded by simultaneously applying the light of 436 nm in wavelength and that of 633 nm in wavelength while appropriately setting the amounts of irradiation respectively.

The information can be erased by applying light of 546 nm in wavelength, for example. The information can also be erased by simultaneously applying the light of 546 nm in wavelength and that of 633 nm in wavelength. Further, the information can be erased by applying only the light of 633 nm in wavelength while appropriately setting the amount of irradiation and the like.

In order to reproduce the information, the light of 436 nm in wavelength preferably has small intensity, since the temperature is increased if the light has strong intensity.

The polymer contained in the optical recording medium is preferably not heated by the heating light nor the light of 436 nm in wavelength.

An experiment which was made in relation to recording/reproduction is now described.

10 parts by weight of a polymer prepared from the polymethacrylic acid shown in FIG. 3, having mean molecular weight of about 20000, and 0.1 part by weight of a photochromic material prepared from the 2,3-bis(2-methyl-benzo[b]thiophene-3-yl) maleic anhydride shown in FIG. 1 were dissolved in 100 parts by weight of methyl cellosolve, serving as a solvent, to prepare a mixed solution.

Then, this mixed solution was applied onto a glass substrate by cast coating, to prepare a film of 30 $\mu$m in thickness for serving as a recording layer.

Then, $SiO_2$ was vapor-deposited on the film to form a protective coat of 1400 Å in thickness, thereby forming an optical recording medium.

Figure 10:
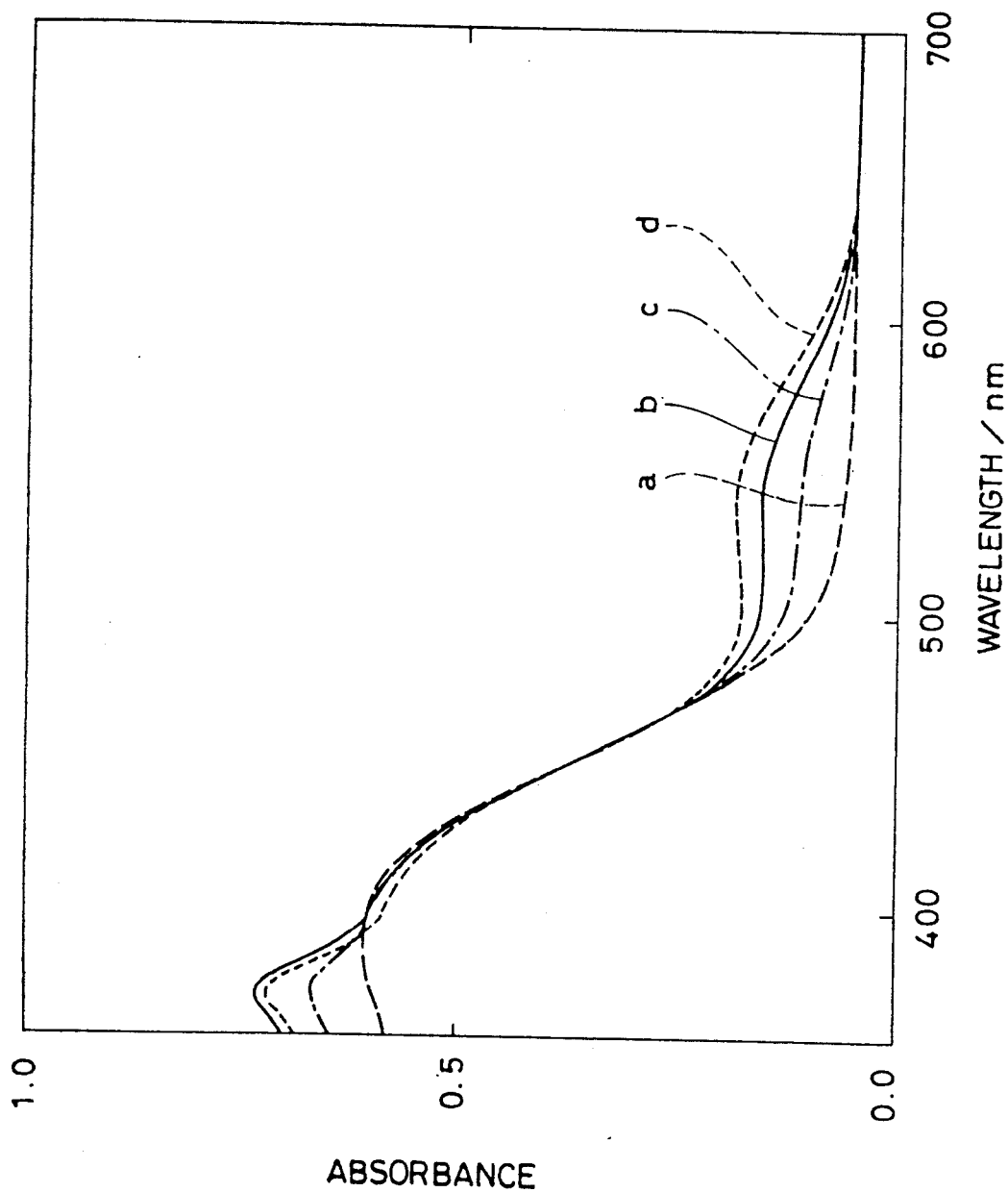
FIG. 10 illustrates absorbance characteristics of photochromic materials.

Light of 546 nm in wavelength was applied to this optical recording medium to entirely bring the photochromic material into a ring-opening state (erased state), to obtain an absorbance curve a shown in FIG. 10.

Then, light of 436 nm in wavelength was applied to the optical recording medium, the temperature of which was raised up to 180° C., for a prescribed period so that absorbance of the optical recording medium at a wavelength of 544 nm was about 80% (recorded state) of absorbance at the temperature of 180° C. in a photostationary state of the optical recording medium, to obtain an absorbance curve b shown in FIG. 10. An absorbance curve d was obtained in the photostationary state at the temperature of 180° C.

Then, light of 436 nm in wavelength having intensity of 0.1 mW/$cm^2$ and that of 633 nm in wavelength having intensity of 1.0 mW/$cm^2$ were applied to the optical recording medium at the ordinary temperature for reproducing information, to obtain an absorbance curve b shown in FIG. 10.

It is understood from FIG. 10 that absorbance approximate to that in information recording is also obtained after reproduction of the information. Background noise appearing in FIG. 10 was caused by the substrate etc.

Thus, it is possible to perform a nondestructive readout operation by previously controlling the levels of intensity and time of irradiation, the heating temperature and the like so that absorbance in information recording is preferably coincident with that in information reproduction.

It is also understood from the above experiment of recording/reproduction that a nondestructive readout operation can be performed similarly to the above also when a ring-opening state of the optical recording medium is used as a recorded state and a mixed state or a photostationary state of the photochromic material, which includes ring-opening and ring-closing states, is used as an erased state (unrecorded state) for reproducing information with the light of 436 nm in wavelength, for example.

Namely, if at least a recorded portion, in which information is recorded, is not heated when the light is applied thereto, the recorded portion, in which the photochromic material is fully in a ring-opening state, is hardly changed from the ring-opening state to a ring-closing state. When the reproducing light is applied to an unrecorded portion (erased portion) of the optical recording medium, on the other hand, at least this erased portion is heated so that the photochromic material is changed from a ring-opening state to a ring-closing state thereby balancing the change from the ring-opening state to a ring-closing state with reverse change. Thus, the erased portion is maintained in the same absorbance as that in the unrecorded/erased state.

Information can be recorded by applying light of 546 nm in wavelength, for example. Information can also be recorded by simultaneously applying the light of 546 nm in wavelength and that of 633 nm in wavelength. Further, information can be recorded by applying the light of 633 nm in wavelength while appropriately setting the amount of irradiation.

The information can be erased by applying light of 436 nm in wavelength, for example, in a heated state for a prescribed period. The information can also be erased by applying light of 436 nm in wavelength, for example, having strong intensity while appropriately setting the amount of irradiation. Further, the information can be erased by simultaneously applying the light of 436 nm in wavelength and that of 633 nm in wavelength.

In order to reproduce information, the light of 436 nm in wavelength preferably has small intensity.

The polymer contained in the optical recording medium is preferably not heated by the heating light nor the light of 436 nm in wavelength.

When long-wave light is applied to appropriately heat the recording layer for reproducing information, the optical recording medium preferably has no absorption in a ring-opening state at the long wavelength of the light, large absorption in a ring-closing state, and small reaction (quantum yield) from the ring-closing state to the ring-opening state.

An experiment which was made in relation to reproduction repetition durability is now described.

Figure 11:
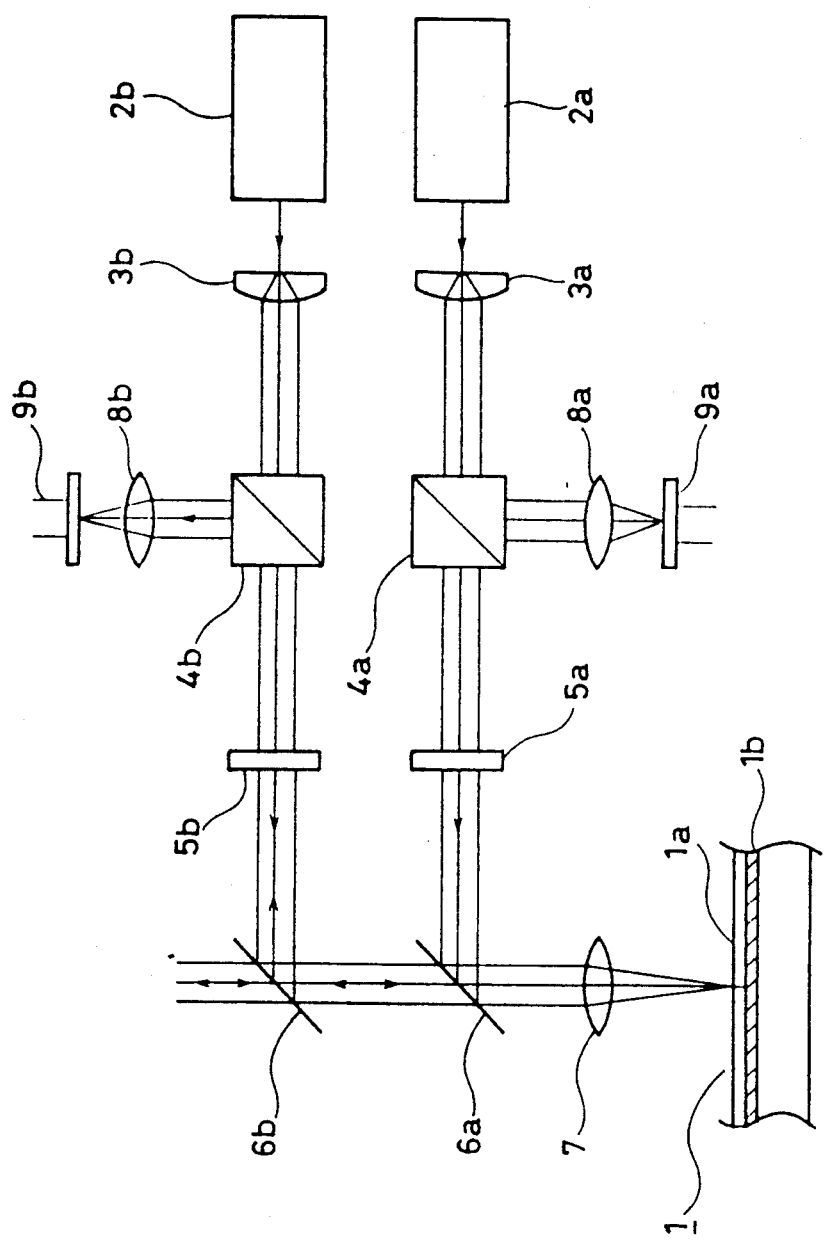
FIG. 11 illustrates an exemplary optical system for making an experiment of repetition durability.

FIG. 11 schematically illustrates an optical system which was employed for this experiment. Referring to FIG. 11, a reflection type optical recording medium 1 is set in the optical system comprising an Ar laser 2a which outputs a linearly polarized pulse laser beam of 458 nm in wavelength and an He-Ne laser 2b which outputs a linearly polarized pulse laser beam of 633 nm in wavelength.

The laser beam outputted from the Ar laser 2a is converted by a collimator lens 3a to a parallel beam, transmitted through a polarized beam splitter 4a as P-polarized light and converted to a circularly polarized light beam by a quarter-wave plate 5a. Thereafter the laser beam is totally reflected by a half mirror 6a, and converged on a recording layer 1a of the optical recording medium 1 through an objective lens 7. The laser beam converged on the recording layer 1a is reflected by a reflective layer 1b and again transmitted through the objective lens 7, to be further reflected by the half mirror 6a, which reflects only the light of 458 nm in wavelength. Thereafter the laser beam is again converted to a linearly polarized light beam by the quarter-wave plate 5a and introduced into the polarized beam splitter 4a as S-polarized light, and thereafter received by a photosensor 9a through a lens 8a. Thus, the light of 458 nm in wavelength is applied to the optical recording medium 1, and the reflectance of the optical recording medium 1 is measured by the photosensor 9a.

On the other hand, the laser beam outputted from the He-Ne laser 2b is converted by a collimator lens 3b to a parallel beam, transmitted through a polarized beam splitter 4b as P-polarized light, and thereafter converted to a circularly polarized light beam by a quarter-wave plate 5b. Thereafter the laser beam is totally reflected by a half mirror 6b, transmitted through the half mirror 6a, and then converged on the recording layer 1a of the optical recording medium 1 through the objective lens 7, similarly to the above. The laser beam converged on the recording layer 1a is reflected by the reflective layer 1b, again transmitted through the objective lens 7 and the which reflects only the light of 633 nm in wavelength. Thereafter the laser beam is again converted to a linearly polarized light beam by the quarter-wave plate 5b and introduced into the polarized beam splitter 4b as S-polarized light, and thereafter received by a photosensor 9b through a lens 8b. Thus, the light of 633 nm in wavelength is applied to the optical recording medium 1, and reflectance of the optical recording medium 1 is measured by the photosensor 9b.

The laser beams of 458 nm and 633 nm in wavelength are so set that the spots thereof are applied to the same portion, with spot diameters of 2 to 3 μm respectively Another optical system (not shown) is provided for observation of the medium 1 and the spot states In order to form the optical recording medium 1, 10 parts by weight of a polymer prepared from the polymethacrylic acid shown in FIG. 3 having mean molecular weight of about 20000 and 0.1 part by weight of a photochromic material prepared from the 2,3-bis(2-methylbenzo[b]thiophene-3-yl) maleic anhydride shown in FIG. 1 were dissolved in 100 parts by weight of methyl cellosolve, serving as a solvent, to prepare a mixed solution. Then the mixed solution was applied onto the reflective layer 1b, which was formed by vapor-depositing an Aλ film of 1500 Å in thickness on a glass substrate, by cast coating and drying the same, thereby forming a film of 30 μm in thickness for serving as the recording layer 1a. It is assumed here that a portion, in which the photochromic material is fully in a ring-opening state, of this optical recording medium 1 is an erased portion (unrecorded portion).

Figure 12:
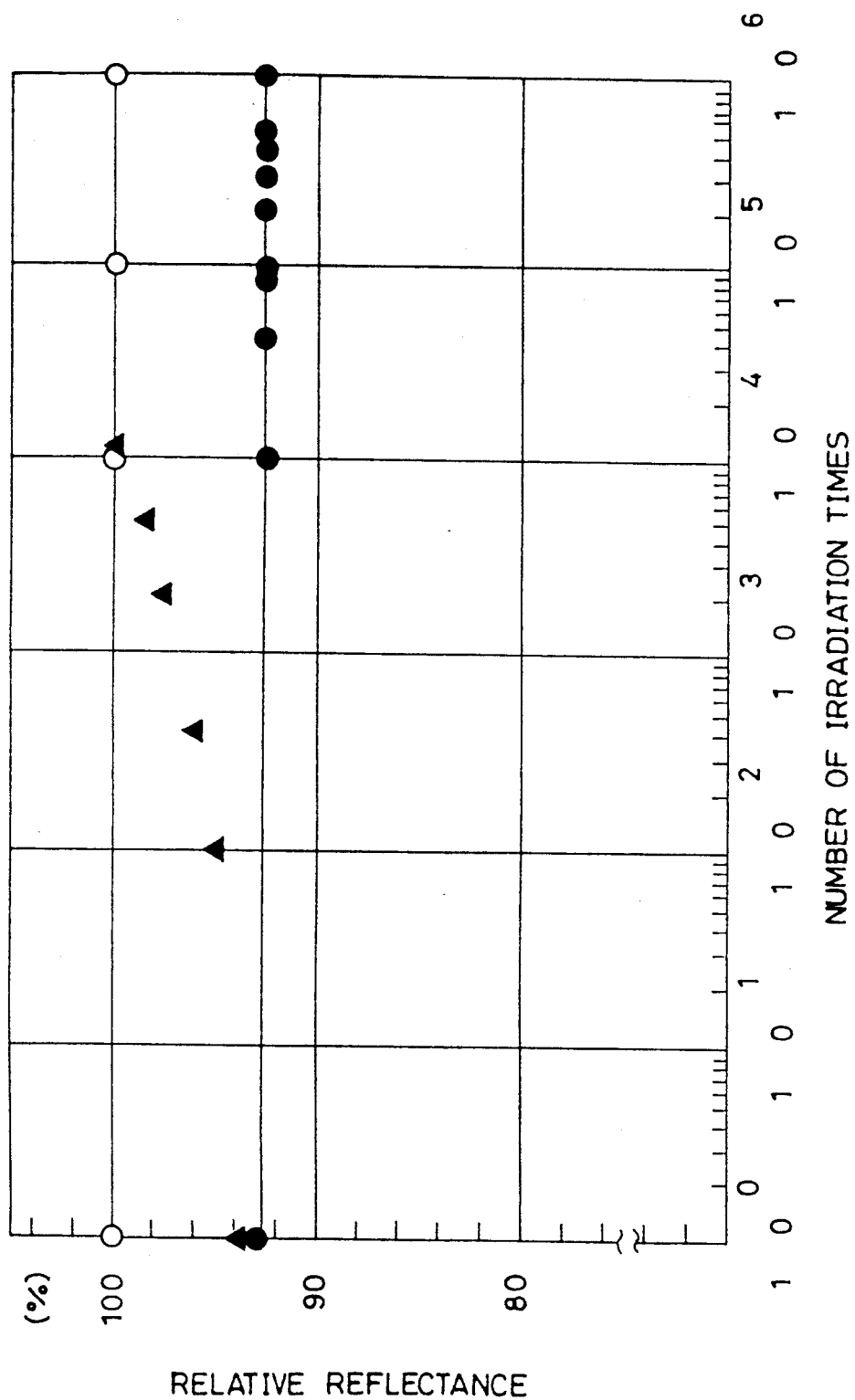
FIG. 12 illustrates results of a repetition durability test.

FIG. 12 shows the results of the following experiments 1 to 3:

In experiment 1, a pulse laser beam (power: 0.075 mW, irradiation time: 10 μs) of 458 nm in wavelength and another pulse laser beam (power 0.5 mW, irradiation time 10 μs) of 633 nm in wavelength were simultaneously applied to the same unrecorded portion of the optical recording medium 1, and reflectance of the laser beam of 633 nm in wavelength was measured The value measured at the start was assumed to be 100%. Referring to FIG. 12, white circles show the results of this operation which was repeated at intervals of 10 ms.

In experiment 2, a pulse laser beam (power: 0.3 mW, irradiation time: 0.1 μs) of 458 nm in wavelength was applied to an unrecorded portion of the optical recording medium 1 to record information, and an operation similar to that of experiment 1 was made on this recorded portion. Referring to FIG. 12, black circles show the results.

In experiment 3, a pulse laser beam (power: 0.3 mW, irradiation time: 0.1 μs) of 458 nm in wavelength was applied to an unrecorded portion of the optical recording medium 1 to record information, and then another pulse laser beam (power: 0.5 mW, irradiation time: 10 μs) of 633 nm in wavelength was applied to the said recorded portion of the optical recording medium 1, for measurement of reflectance in relation to the laser beam of 633 nm in wavelength. Then, the laser beam of 633 nm in wavelength was repeatedly applied at intervals of 10 ms. Referring to FIG. 12, black triangles show the results.

It is understood from FIG. 12 that the reflectance of the recorded portion is inevitably changed to destroy the information when only the laser beam of 633 nm in wavelength is applied and the reflectance is repeatedly measured to reproduce the information. It is also understood that the reflectance values of the unrecorded and recorded portions substantially remain in the initial states when the laser beams of 458 nm and 633 nm in wavelength are simultaneously applied and reflectance values are repeatedly measured to reproduce the information. Thus, it is possible to perform a nondestructive readout operation.

Example 2 of the present invention is now described.

Figure 13:
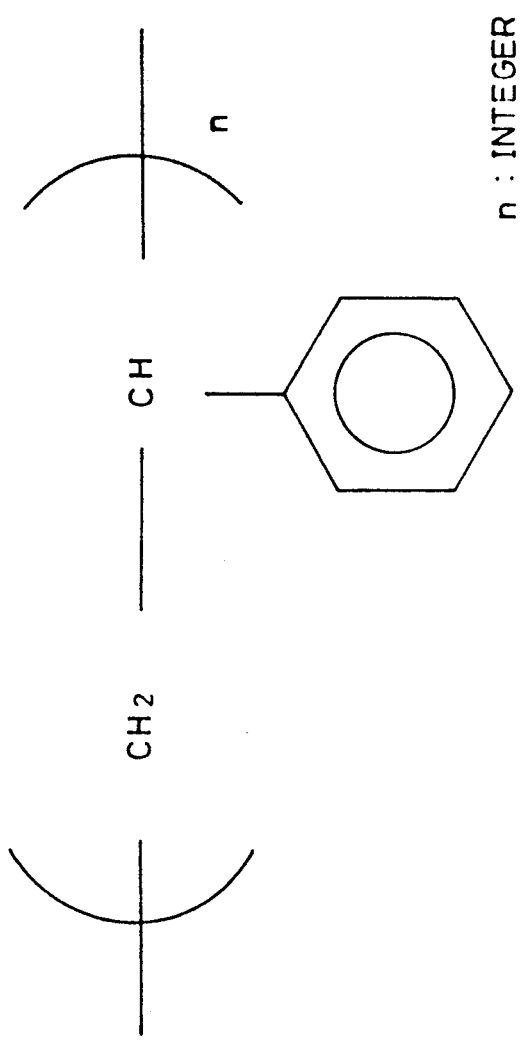
FIG. 13 illustrates the structural formula of polystyrene.

Optical recording media according to this example were prepared to contain the photochromic material which was employed in Example 1 and polystyrene (hereinafter referred to as PS), whose structural formula is shown in FIG. 13, having mean molecular weight of about 20000.

FIG. 14 shows compositions of samples Nos. B-1 to B-8, each of which was prepared by dissolving the photochromic material and polystyrene in 100 g of cyclohexanone, serving as a solvent. Each sample was applied onto a glass substrate by spin coating at a speed of 700 r.p.m., and then the solvent was evaporated to form a recording layer.

Figure 15:
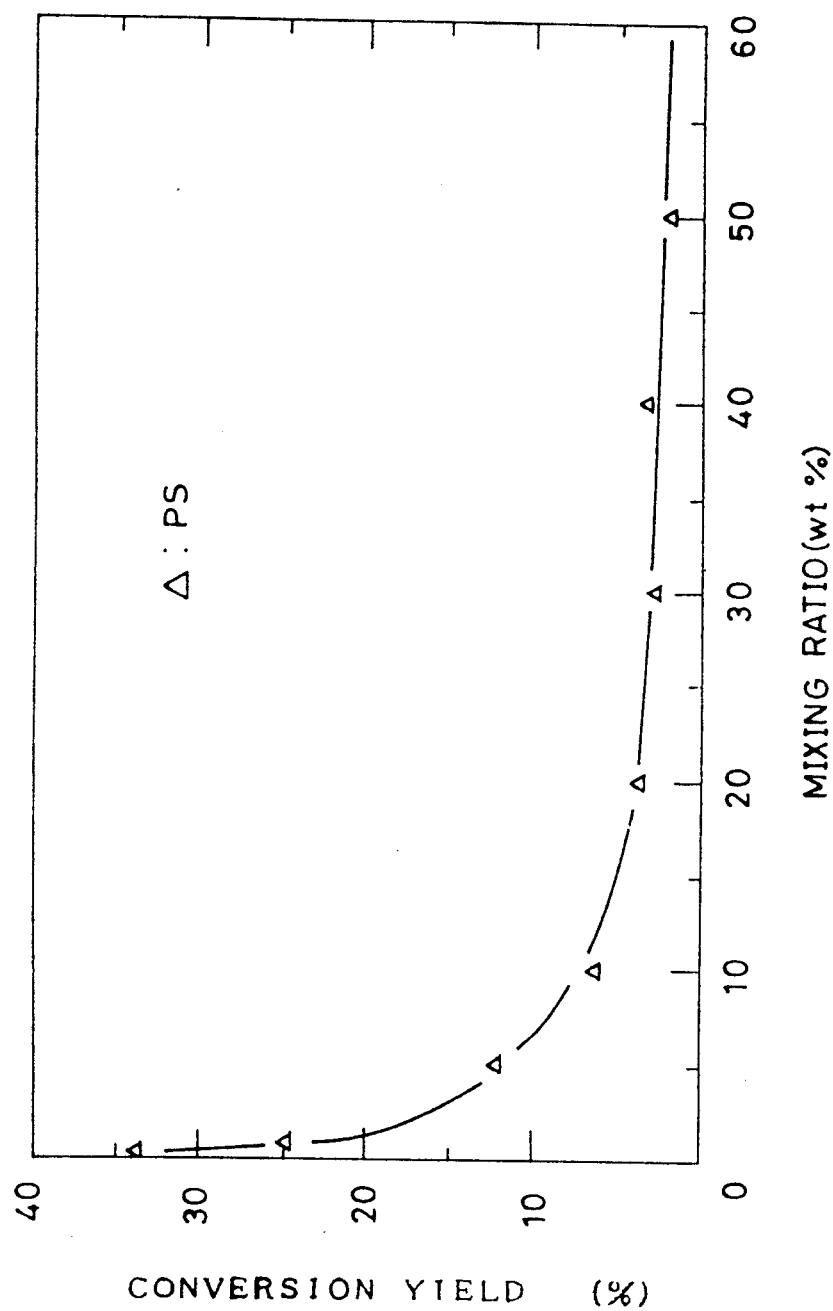
FIG. 15 illustrates relations between conversion yields of ring-closing states converted from ring-opening states and mixing ratios of photochromic materials in Example 2.
Figure 16:
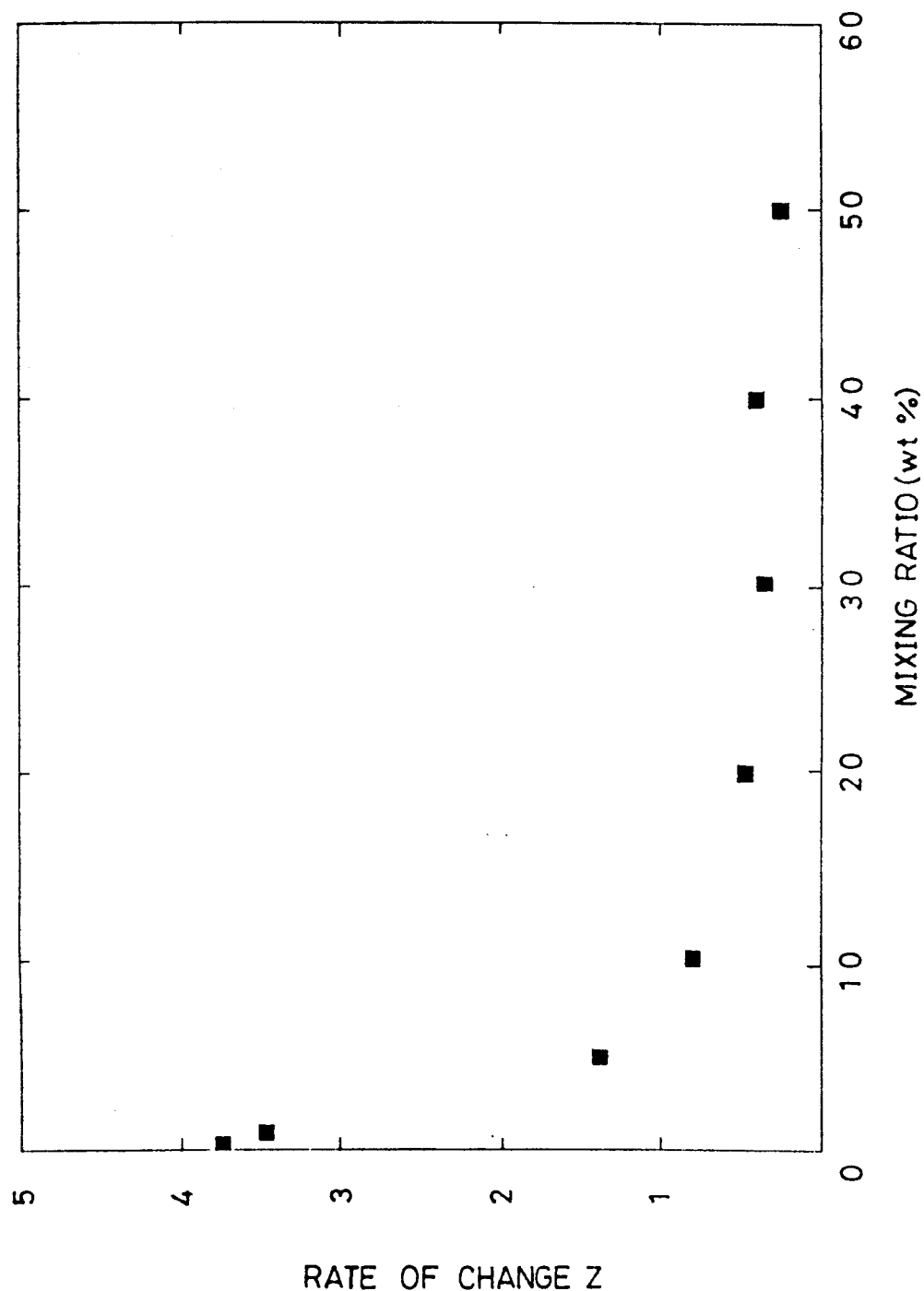
FIG. 16 illustrates relations between rates Z of change and mixing ratios in Example 2.

In a similar manner to Example 1, relations were obtained as to conversion yields (%) of ring-closing states converted from ring-opening states upon irradiation with light of 436 nm in wavelength and mixing ratios (wt.%) of the photochromic material with respect to polystyrene. FIG. 15 shows the results Referring to FIG. 15, the axis of ordinates represent the conversion yields (%) of the ring-closing states, and the axis of abscissas represents the mixing ratios (wt.%). FIG. 16 shows relations between rates Z of change and the mixing ratios. It is understood from FIG. 16 that the rates Z of change are abruptly increased when the mixing ratios and less than 10 percent by weight The conversion yields of the ring-closing states are increased as compared with the case of the polymethacrylic acid as shown in FIG. 15, conceivably because interaction between the photochromic material and the polymer is small.

Figure 17:
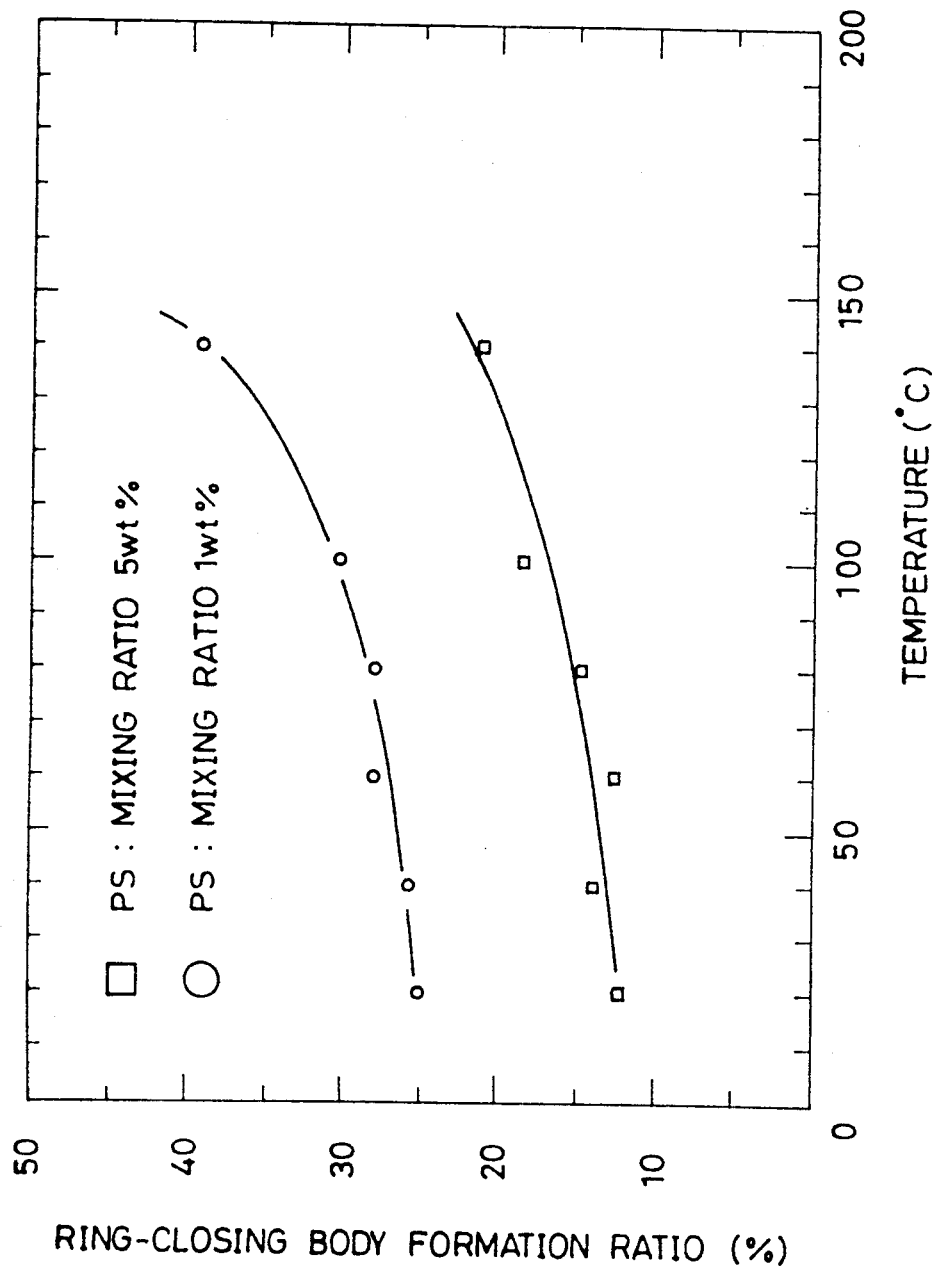
FIG. 17 illustrates temperature dependency values of conversion yields in Example 2.
Figure 18:
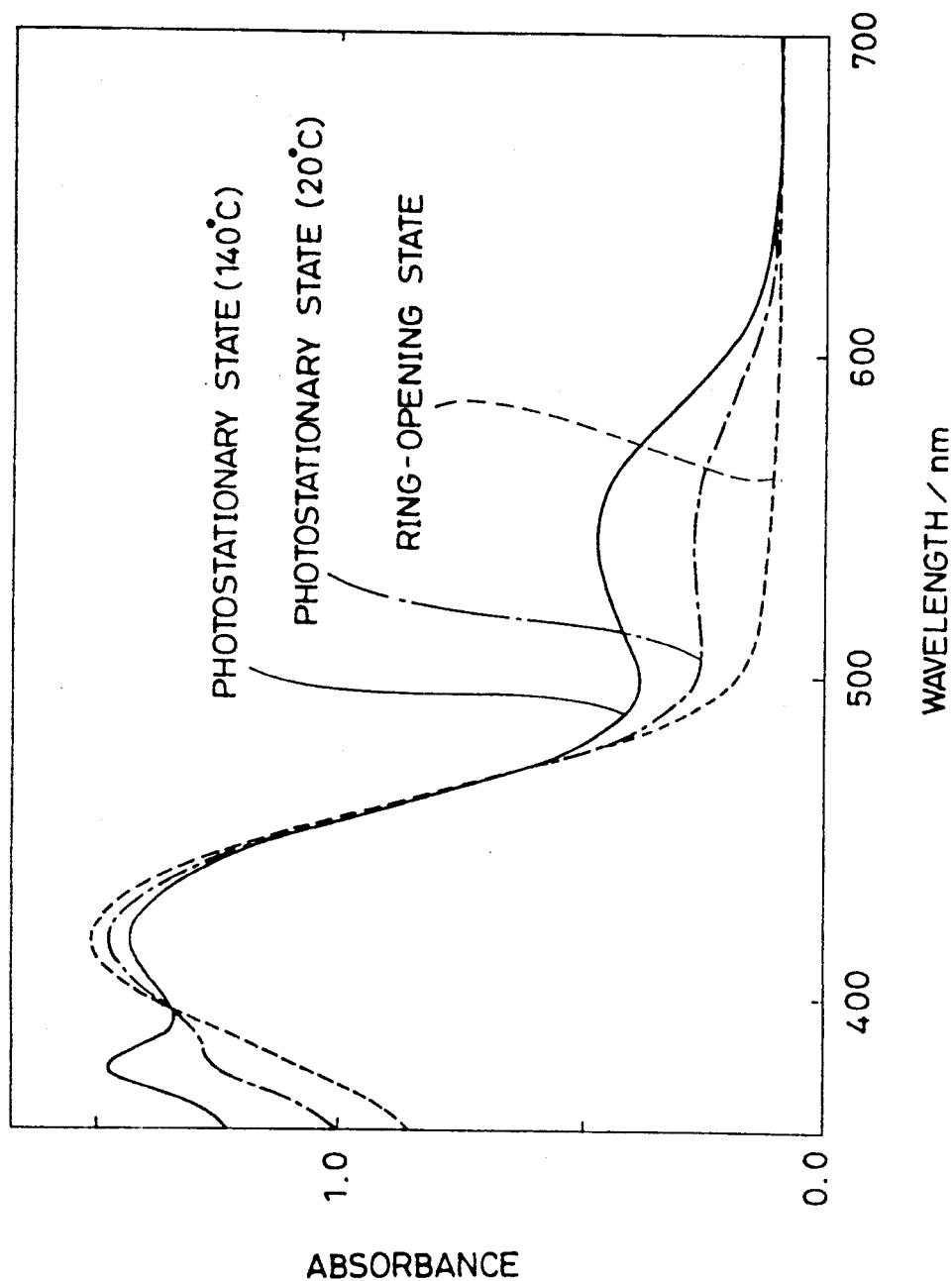
FIG. 18 illustrates absorbance of a photochromic material.

Also in a similar manner to Example 1, relations were obtained as to the conversion yields (%) of the ring-closing states converted from the ring-opening states upon irradiation with the light of 436 nm in wavelength and temperatures (° C.). FIG. 17 shows the results. Referring to FIG. 17, the axis of ordinates represents the conversion yields (%) of the ring-closing states, and the axis of abscissas represents the temperatures (° C.). FIG. 18 shows absorbance characteristics of photostationary states of an optical recording medium, which was formed using the sample No. b-7, at 20° C. and 140° C.

It is understood from FIGS. 17 and 18 that the optical recording media containing the photochromic material and polystyrene have remarkable temperature dependency characteristics. Thus, it is understood that a nondestructive readout operation can be performed in a similar manner to Example 1.

A method of performing a nondestructive readout operation is now described. It is assumed here that a ring-opening state is used as an unrecorded/erased state, and a mixed state (or photostationary state) is used as a recorded state.

Information can be recorded in a similar manner to Example 1. In order to reproduce the information, however, it is necessary to further control power levels, wavelengths and the like of light of 436 nm in wavelength and heating light of 633 nm in wavelength, for example, since a ring-opening state of the optical recording medium is relatively easily changed to a ring-closing state upon irradiation with the light of 436 nm in wavelength, for example, also at the room temperature.

In order to reproduce the information, two light beams of different wavelengths, i.e., light of a specific wavelength of 436 nm, for example, for causing reaction and heating light of 633 in wavelength, for example, are applied to the optical recording medium similarly to Example 1, and reflected light, for example, of one of the two light beams is detected. The wavelengths, intensity levels and the like of the two light beams of different wavelengths may be so set that conversion yields of a ring-opening state converted from a ring-closing state is equal to or greater than that of a ring-closing state converted from a ring-opening state when the two light beams are applied to an erased portion while such formation ratios of the ring-opening state and the ring-closing state are equal to each other at a prescribed temperature caused since a recorded portion has absorption when the light beams are applied to the recorded portion.

It is clearly understood from the above description that information can be reproduced in a similar manner to the above also when a ring-opening state of the optical recording medium is used as a recorded state and a mixed state or a photostationary state of the photochromic material, which includes ring-opening and ring-closing states, is used as an erased state.

Example 3 of the present invention is now described.

Figure 19:
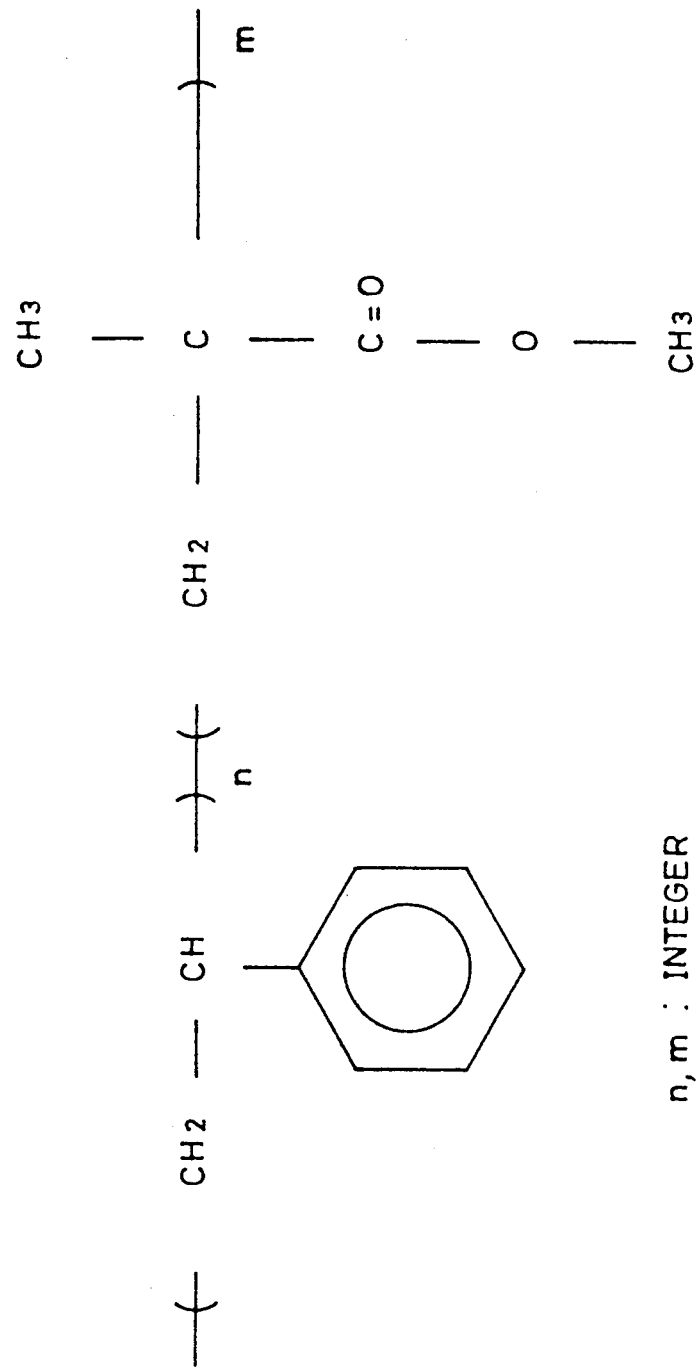
FIG. 19 illustrates the structural formula of a styrene-methyl methacrylate copolymer.

Optical recording media according to this example were prepared to contain the photochromic material which was employed in Example 1 and a styrene-methyl methacrylate copolymer (hereinafter referred to as SMMA), whose structural formula is shown in FIG. 19, having mean molecular weight of about 15000.

FIG. 20 shows compositions of samples Nos. C-1 to C-6, each of which was prepared by dissolving the photochromic material and styrene-methyl methacrylate copolymer in 100 g of cyclohexanone, serving as a solvent. Each sample was applied onto a glass substrate by spin coating at a speed of 700 r.p.m., and then the solvent was evaporated to form a recording layer.

Figure 21:
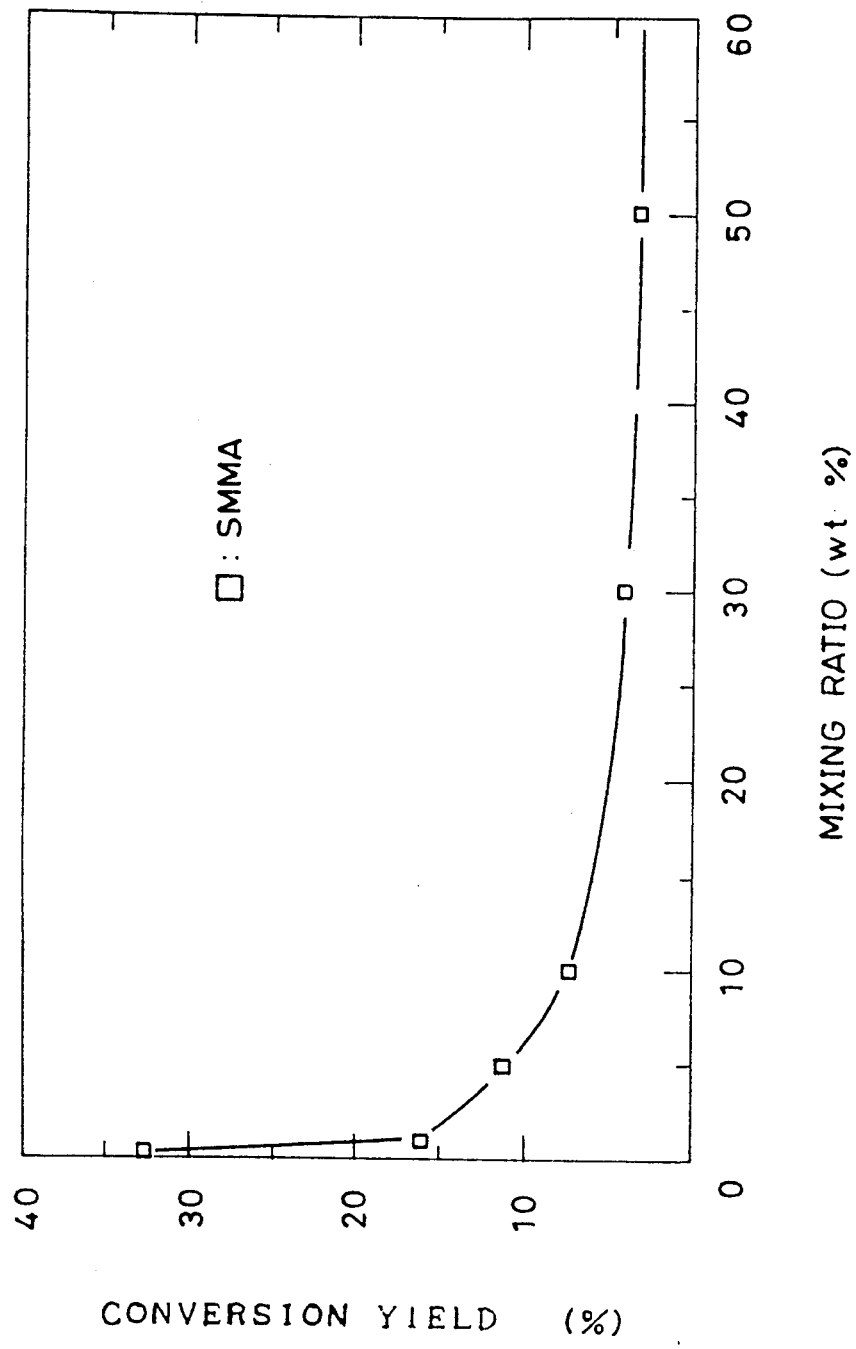
FIG. 21 illustrates relations between conversion yields of ring-closing states converted from ring-opening states and mixing ratios of the photochromic materials in Example 3.
Figure 22:
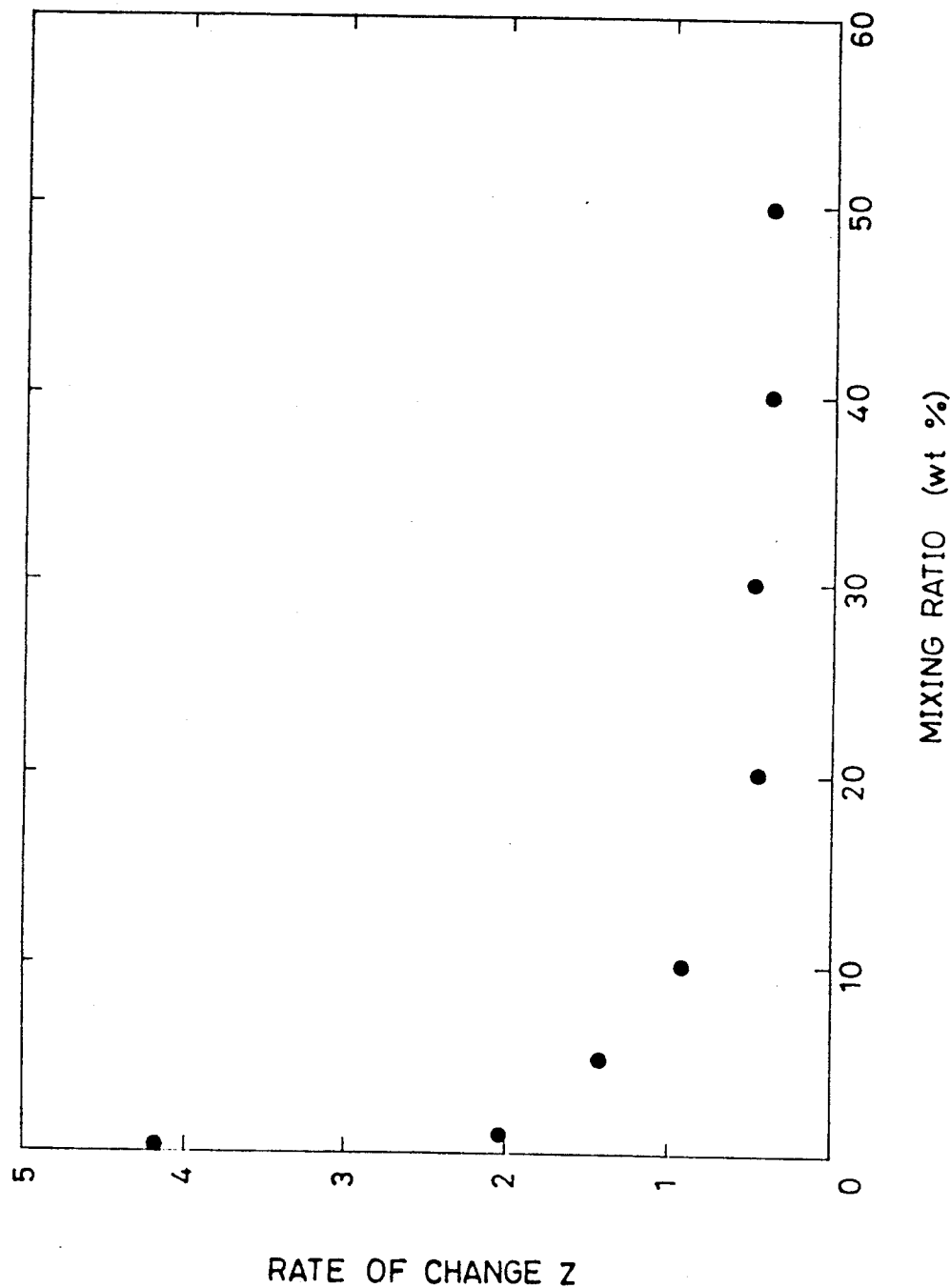
FIG. 22 illustrates relations between rates Z of change and mixing ratios in Example 3.

In a similar manner to Example 1, relations were obtained as to conversion yields (%) of ring-closing states converted from ring-opening states upon irradiation with light of 436 nm in wavelength and the mixing ratios (wt.%) of the photochromic materials to the styrene-methyl methacrylate copolymers. FIG. 21 shows the results. Referring to FIG. 21, the axis of ordinates represents the conversion yields (%) of the ring-closing states, and the axis of abscissas represents the mixing ratios (wt.%). FIG. 22 shows relations between rates Z of change and the mixing ratios. It is understood from FIG. 22 that the rates Z of change are abruptly increased when the mixing ratios are less than 10 percent by weight.

The conversion yields of the ring-closing states are increased as compared with the case of the polymethacrylic acid as shown in FIG. 21, conceivably because the interaction between the photochromic material and the polymer is small.

Figure 23:
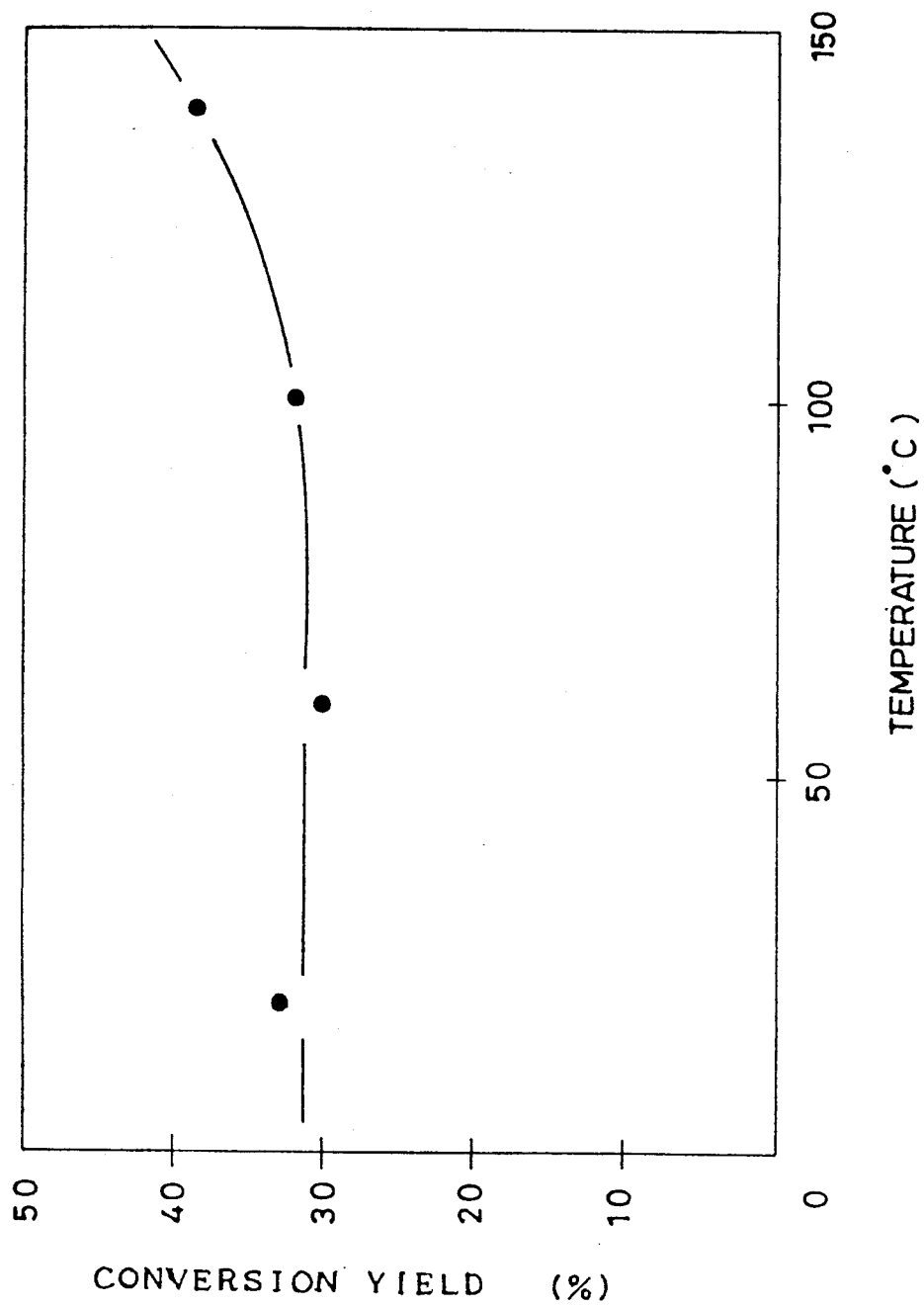
FIG. 23 illustrates temperature dependency values of conversion yields in Example 3.

Also in a similar manner to Example 1, a relation was obtained, using an optical recording medium which was prepared by the sample No. C-5, as to the conversion yields (%) of the ring-closing state converted from the ring-opening state upon irradiation with light of 436 nm in wavelength and temperatures (° C.). FIG. 23 shows the result. Referring to FIG. 23, the axis of ordinates represents the conversion yields (%) of the ring-closing state, and the axis of abscissas represents the temperatures (° C.).

It is understood from FIG. 23 that an optical recording medium containing the photochromic material and the styrene-methyl methacrylate copolymer has remarkable temperature dependency. Thus, it is understood that a nondestructive readout operation can be performed in a similar manner to Example 2.

Example 4 of the present invention is now described.

Figures 24, 25:
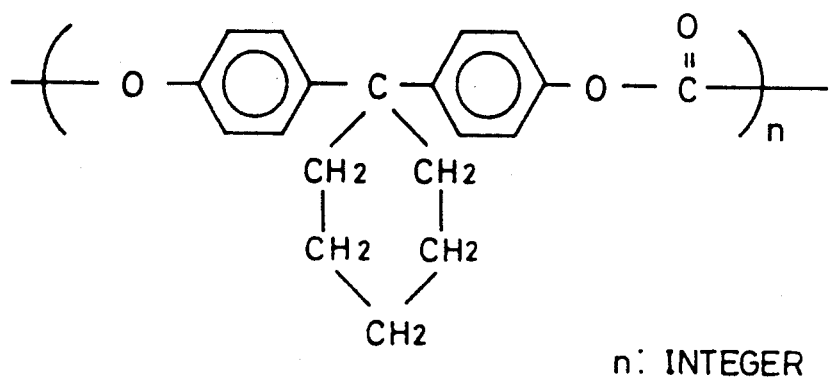
FIG. 24 illustrates the structural formula of polycarbonate.
FIG. 25 illustrates mixing ratios of photochromic materials to polymers contained in recording layers in Example 4 of the present invention.

The photochromic material employed in Example 1 and a polymer containing an aryl group, which was prepared from polycarbonate (hereinafter referred to as PC), whose structural formula is shown in FIG. 24, having mean molecular weight of about 20000 were dissolved in 100 mλ of dioxane, serving as a solvent, to prepare samples (solutions) Nos. D-1 to D-6 shown in FIG. 25.

Similarly to Example 1, each sample was applied onto a glass substrate by spin coating at a speed of 700 r.p.m., and thereafter the solvent was evaporated to form a recording layer, thereby preparing a recording medium.

Then, laser beams of 546 nm in wavelength were applied to the recording layers of the samples Nos. D-1 to D-6 to bring the photochromic materials fully into states A, which were ground states, and absorbance values were measured. Thereafter beams of 436 nm in wavelength were applied to the portions irradiated with the aforementioned laser beams to convert the same to photostationary states, and absorbance values were measured. Rates Z of change were evaluated from the measured values.

Figure 26:
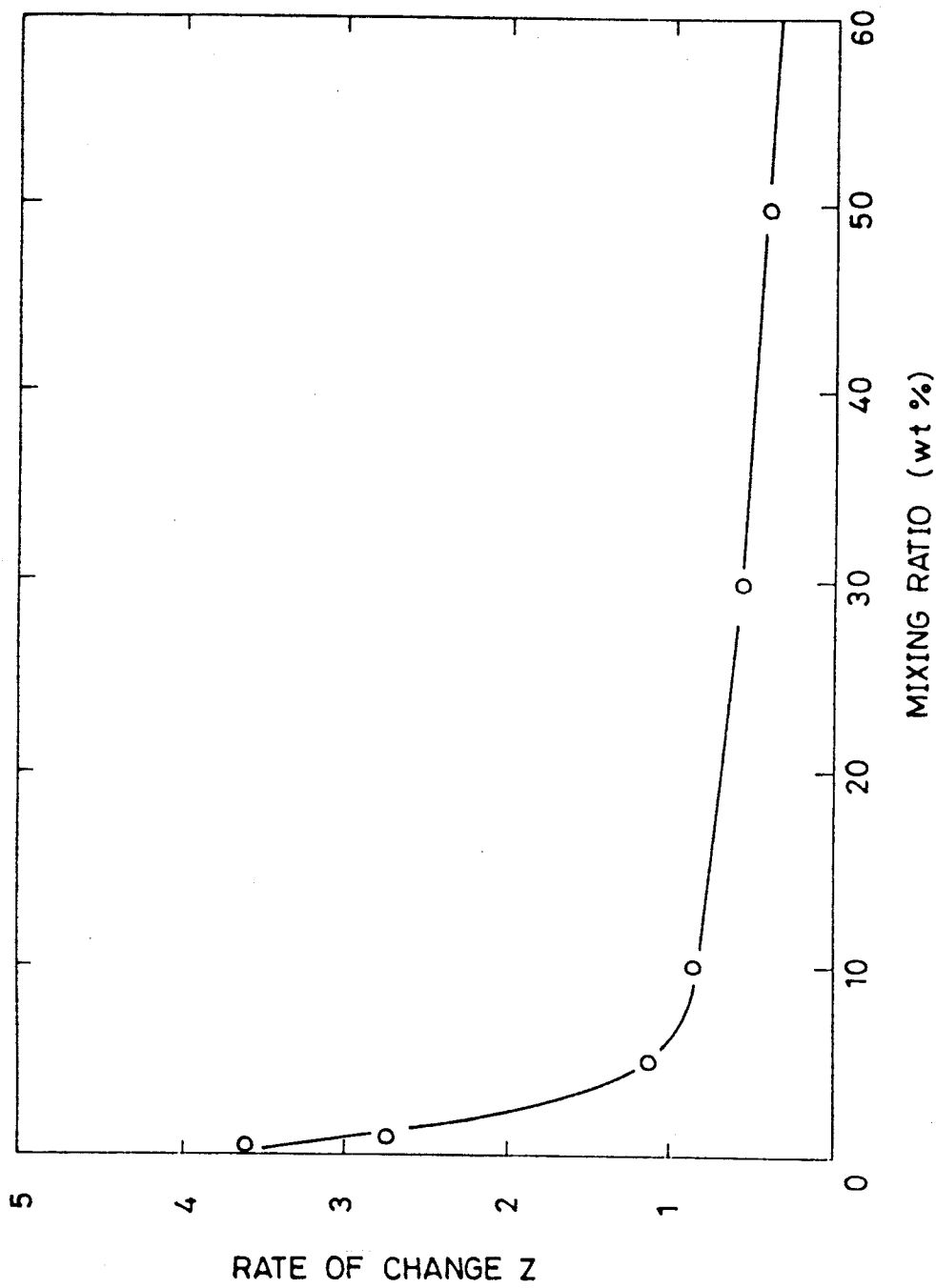
FIG. 26 illustrates relations between rates Z of change and mixing ratios in Example 4.

FIG. 26 shows the results. Referring to FIG. 26, the axis of ordinates represents the rates Z of change from the states A to states B of the photochromic compounds, while the axis of abscissas represents mixing ratios (wt.%) of the photochromic compounds to polycarbonate.

As understood from FIG. 26, the rates of change from the states A to the states B of the photochromic compounds are abruptly increased by irradiation with the light of 436 nm in wavelength when the mixing ratios are not more than 10 percent by weight, similarly to Example 1.

Thus, information recording/reproducing efficiency is improved in a recording medium having a recording layer which contains the photochromic compound in a mixing ratio of not more than 10 percent by weight with respect to polycarbonate.

Example 5 of the present invention is now described.

Figures 27, 28:
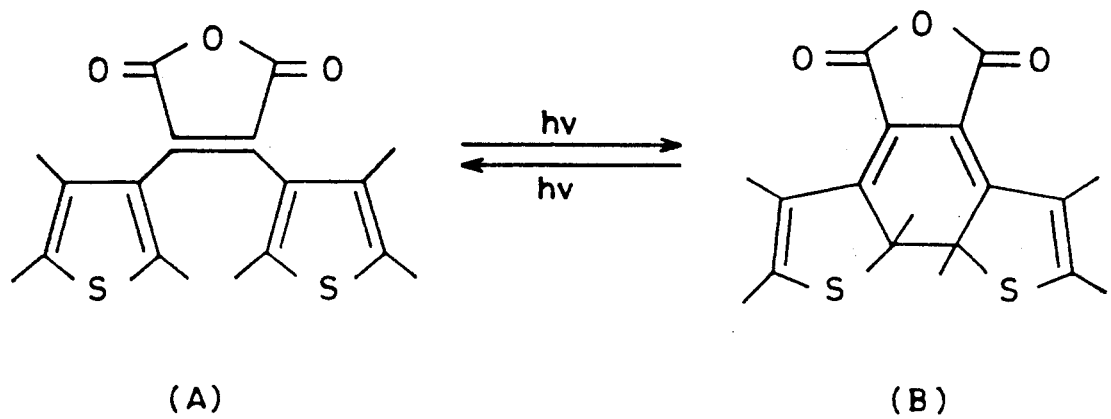
FIG. 27 illustrates the structural formula of a 2,3-di(2,3,5-trimethylthienyl) maleic anhydride employed in the present invention.
FIG. 28 illustrates mixing ratios of photochromic materials to polymers in recording layers in Example 5 of the present invention.

The photochromic compound employed in each of Examples 1 to 4 was replaced by a 2,3-di(2,3,5-trimethylthienyl) maleic anhydride, whose reaction formula is shown in FIG. 27. This photochromic compound and the same polystyrene as that in Example 2 were dissolved in 100 mλ of cyclohexanone, serving as a solvent, to prepare samples (solutions) Nos. E-1 to E-6 shown in FIG. 28.

Similarly to Example 2, each sample was applied onto a glass substrate by spin coating at a speed of 700 r.p.m., and thereafter the solvent was evaporated to form a recording layer, thereby preparing a recording medium. Then, laser beams of 546 nm in wavelength were applied to the recording layers of the samples Nos. E-1 to E-6 to bring the photochromic compounds fully into states A, which are ground states, and absorbance values were measured. Then, light beams of 436 nm in wavelength were applied to the portions irradiated with the aforementioned laser beams to bring the same into photostationary states, and absorbance values were measured. Rates Z of change were evaluated from the measured values. The rates Z of change were not those at the peaks of the absorbance values, but evaluated through conversion.

Figure 29:
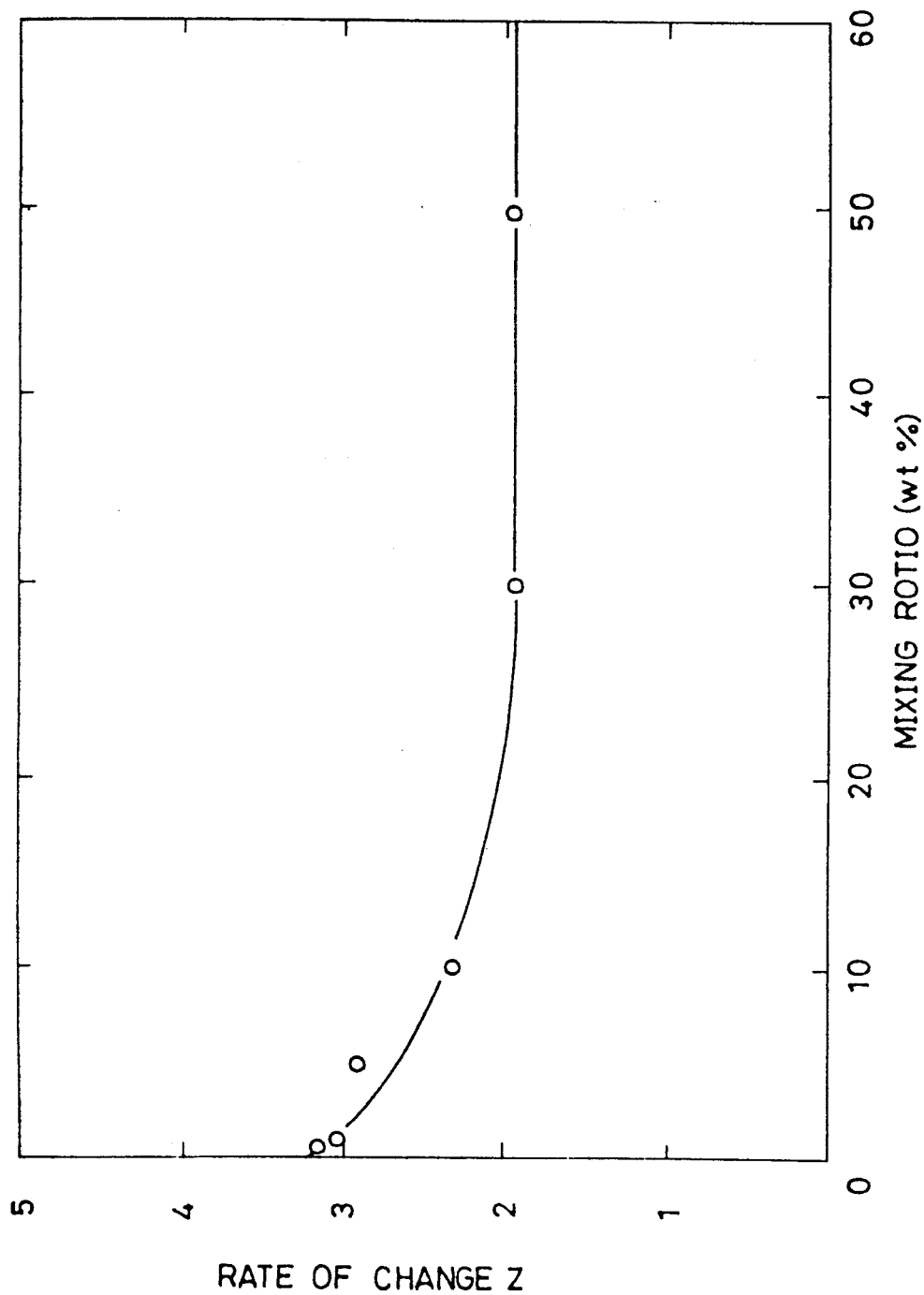
FIG. 29 illustrates relations between rates Z of change and mixing ratios in Example 5.

FIG. 29 shows the results Referring to FIG. 29, the axis of ordinates represents the rates Z of change from the states A to states B of the photochromic compounds, while the axis of abscissas represents mixing ratios (wt.%) of the photochromic compounds to polystyrene.

As understood from FIG. 29, the rates of change of the photochromic compounds from the states A to the states B are abruptly increased by irradiation with the light of 436 nm in wavelength when the mixing ratios are not more than 10 percent by weight, similarly to Example 1.

Thus, information recording/reproducing efficiency is improved in a recording medium having a recording layer which contains the photochromic compound in a mixing ratio of not more than 10 percent by weight with respect to the polystyrene.

According to Examples 1 to 5, it is confirmed that photochromic reaction is hardly caused when the mixing ratio of the photochromic compound to the polymer is at least 20 percent by weight, even if light of a wavelength which is absorbed by the photochromic compound is applied. In order to optically record information in the inventive optical recording medium, therefore, the mixing ratio of the photochromic compound to the polymer must be less than 20 percent by weight As shown in Examples 1 to 5, an optical recording medium containing a diarylethene derivative having at least one thiophene ring and a polymer has temperature dependency in the rate of change from a ring-opening state to a ring-closing state. The rate of change is increased as the temperature is increased and the mixing ratio of the diarylethene derivative to the polymer is reduced, particularly to about 1 percent by weight. Therefore, it is possible to improve sensitivity of information recording/reproduction by increasing the temperature-and reducing the mixing ratio.

The ring-closing state can be easily converted to a ring-opening state by irradiation with light of a prescribed wavelength, which is absorbed not in the ring-opening state but in the ring-closing state. Thus, it is possible to easily record, reproduce or erase information.

In the photostationary state, the mixing ratio of a ring-closing state to a ring-opening state is varied with temperatures. Thus, this mixed state can be used as a recorded or erased state. The temperatures can be adjusted simultaneously with photochemical reaction,-by appropriately selecting light of a band absorbed by the ring-opening state, adjusting the amount of irradiation and applying this light Further, the mixed state can be formed by application of the light, without employing a photostationary state at each temperature.

Since long-wave light which is absorbed not in a ring-opening state but in a ring-closing state is converted to heat at a high rate, a nondestructive readout operation can be performed by applying this light and light of a prescribed wavelength The principle of the present invention for enabling recording, reproduction or erasing at a high speed is now described in relation to the aforementioned optical recording medium having temperature dependency.

The aforementioned optical recording medium, which causes photochemical reaction upon irradiation with light of a specific wavelength when the same is at a prescribed temperature, is previously set at the prescribed temperature so that setting of the prescribed temperature brings no rate-determining step which causes photochemical reaction. This principle is described with reference to a nondestructive readout operation which is performed through the optical recording medium, assuming that the ring-closing state is used as an erased state.

In order to reproduce information, the overall optical recording medium or a portion for reproducing information may be appropriately previously set at a prescribed temperature in response to a recorded portion and an erased portion (unrecorded portion) before light of 436 nm in wavelength, for example, is applied When the light of 436 nm in wavelength as well as that of 633 nm in wavelength are applied for reproducing information (nondestructive readout), it is possible to heat the recorded portion to the prescribed temperature with the light of 633 nm in wavelength. Since it is possible to make the erased portion not heated, the spot of the light of 436 nm in wavelength may be provided within that of the light of 633 nm in wavelength. In this case, a region for reproducing the information is substantially identical in size to the spot of the light of 436 nm in wavelength.

If the sizes of the aforementioned spots are reversed, setting of the prescribed temperature brings a rate-determining step which causes photochemical reaction, although the region for reproducing the information is substantially identical in size to the spot of the light of 633 nm in wavelength.

This also applies to a case where the ring-opening state of the optical recording medium is used as a recorded state and a mixed state of ring-opening and ring-closing states is used as an erased state Information can also be appropriately recorded or erased by a similar method. In an optical system for such operations, one of the aforementioned two light beams may be passed through a larger number of lenses etc. than the other beam, to be applied to the optical recording medium.

The inventive method of enabling high-density recording is now described in relation to the aforementioned optical recording medium having temperature dependency.

When heating light for bringing the optical recording medium to a prescribed temperature and the aforementioned light of a specific wavelength for causing photochemical reaction are so simultaneously applied that respective spots A and B are partially overlapped with each other as shown in FIG. 30, photochemical reaction is caused only in the overlapped portion of the spots A and B. Thus, it is possible to extremely reduce the size of the portion where the photochemical reaction is caused by reducing the overlapped portion of the spots A and B, regardless of the spot diameters.

Figure 31:
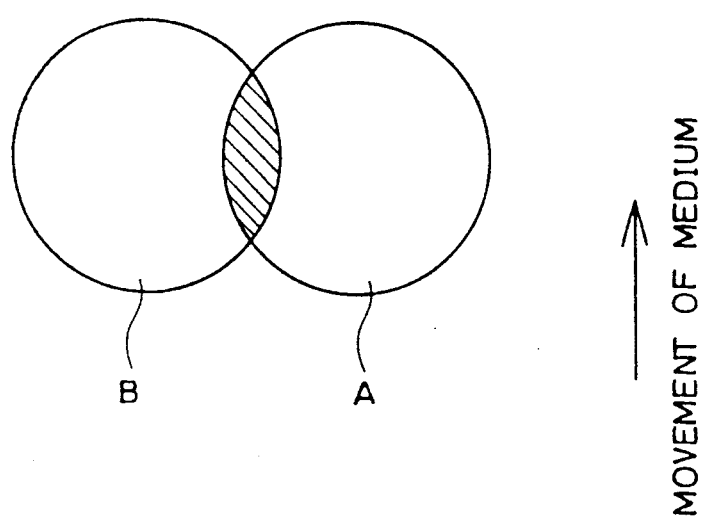
FIG. 31 illustrates other exemplary spots of heating light and light of a specific wavelength applied to an optical recording medium according to the present invention.

While either the spot A of the heating light or the spot B of the light of a specific wavelength may precede, it is preferable that the spot B takes the precedence of the spot A and intensity of the heating light is increased to bring the optical recording medium into the prescribed temperature in a short period. If the spots A and B are reversed in order, photochemical reaction may also be caused in a portion other than the overlapped portion of the spots A and B, since a region of the prescribed temperature remains by heating with the spot of the heating light. The spots A and B may be overlapped with each other perpendicularly to the direction of movement of the optical recording medium as shown in FIG. 31, and a direction for overlapping the spots A and B can be appropriately changed.

Figure 32:
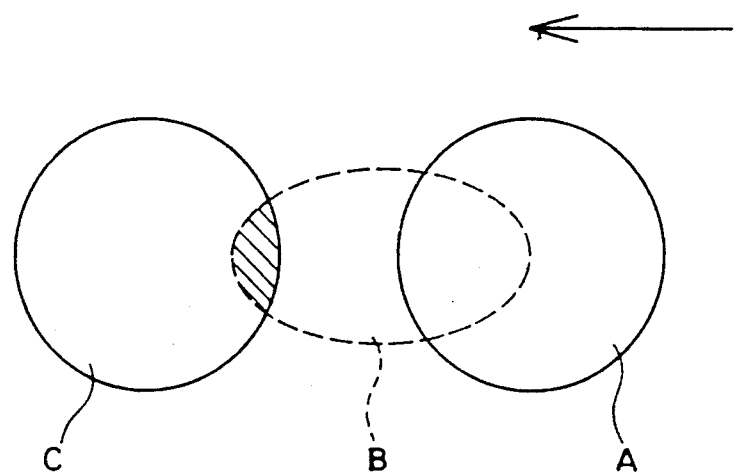
FIG. 32 illustrates further exemplary spots of heating light and light of a specific wavelength applied to an optical recording medium according to the present invention.

A method of implementing high-density recording without overlapping the spot A of the heating light with the spot B of the light of the specific wavelength is now described with reference to FIG. 32.

Since the reaction time of thermal reaction caused by non-radiation deactivation or the like is longer than that of optical reaction, it is possible to control power etc. of heating light to bring a region C irradiated with a spot A of the heating light to a prescribed temperature, thereby causing photochemical reaction only in a region where the region C is overlapped with a spot B of light of a specific wavelength.

Thus, it is possible to extremely reduce the size of a portion where photochemical reaction is caused by reducing the size of the overlapped portion of the region of the prescribed temperature and the spot of the light of the specific wavelength. Since the spot of the heating light takes the precedence of that of the light of the specific wavelength to previously bring the portion where photochemical reaction is caused to a prescribed temperature, setting of the prescribed temperature brings no rate-determining step causing photochemical reaction. Thus, information can be recorded, reproduced or erased at a high speed.

The inventive method attained a remarkable effect particularly when the same was applied to the aforementioned optical recording medium.

Since the optical recording medium can be heated to a prescribed temperature by irradiation with the light of 633 nm in wavelength, for example, information can be recorded by applying the light of 436 nm in wavelength to the medium for causing photochemical reaction from a ring-opening state to a mixed state, while the information can be reproduced (non-destructive readout) by irradiation with the light of 436 nm in wavelength as well as the light of 633 nm in wavelength, for example. This also applies to a case where a ring-opening state of the optical recording medium is used as a recorded state and a mixed state is used as an erased state.

An apparatus for reproducing information from the optical recording medium having temperature dependency may comprise at least a light source, such as a laser or a light emitting diode, for outputting light of the aforementioned wavelength for heating, another light-source, such as a laser, for outputting light of a specific wavelength, a photosensor, and the like. Since the temperature of the optical recording medium is varied with temperature change of the environment, it is necessary to appropriately change optimum temperatures of the heating light and the light of the specific wavelength. Thus, it is preferable to provide a temperature sensor for controlling the light outputted from each light source in response to a signal from this sensor.

Figure 33:
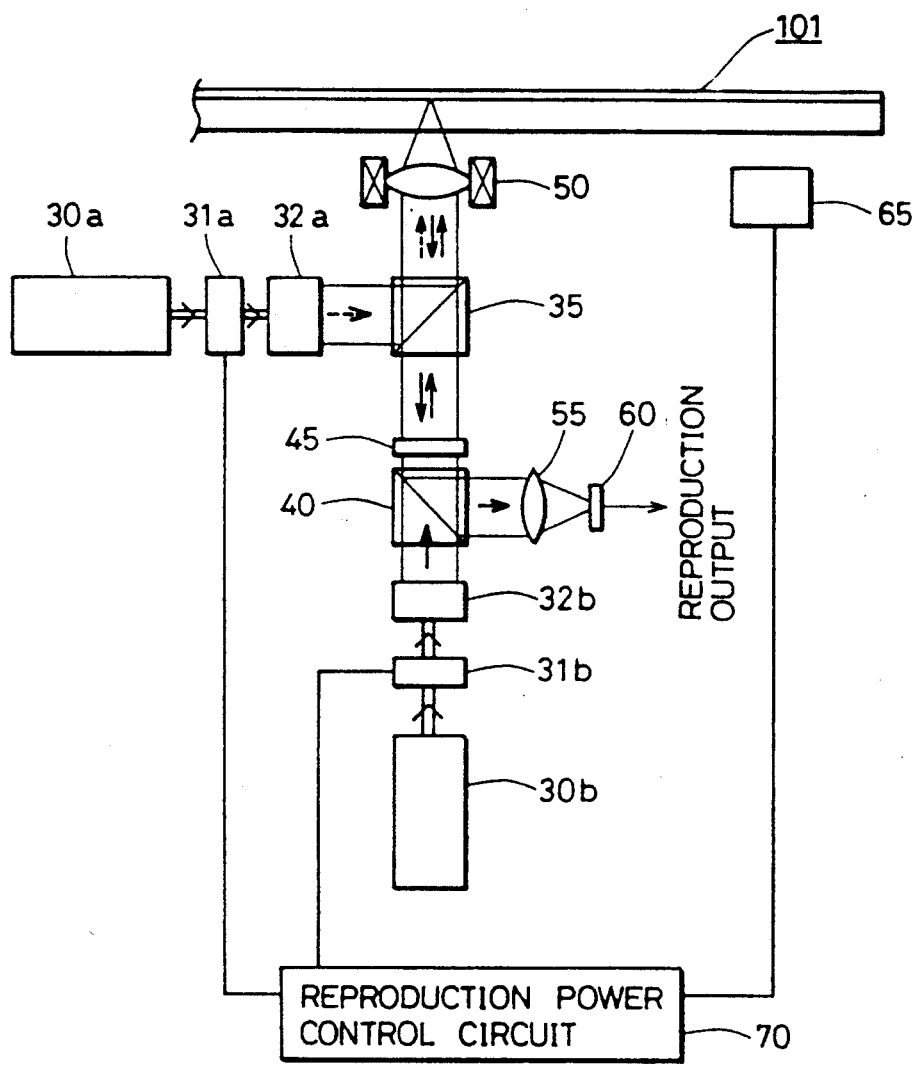
FIG. 33 illustrates an embodiment of an optical system for recording, reproducing or erasing information in, from or from an optical recording medium having temperature dependency.

FIG. 33 shows an embodiment of a recording/reproducing apparatus for recording, reproducing or erasing information in, from or from an optical recording medium 101 having temperature dependency.

This apparatus comprises an Ar laser 30a for outputting a beam of 458 nm in wavelength, and an He-Ne laser 30b for outputting a beam of 633 nm in wavelength. Each laser has a circuit (not shown) whose output is appropriately set in response to recording, reproduction or erasing of information.

The laser beam outputted from the Ar laser 30a is controlled to prescribed power by a power control unit 31a and expanded by a beam expander 32a, to be introduced into a dichroic mirror 35.

On the other hand, the laser beam outputted from the He-Ne laser 30 is similarly controlled to prescribed power by a power control unit 31b and expanded by a beam expander 34b, to be totally transmitted through a polarized beam splitter 40 as P-polarized light. Thereafter the laser beam is converted to a circularly polarized light beam by a quarter-wave plate 45, and introduced into the dichroic mirror 35.

The dichroic mirror 35 is adapted to totally reflect light of about 458 nm in wavelength, while totally transmitting light of about 633 nm in wavelength. The two laser beams outgoing from the dichroic mirror 35 are so set that the optical axes thereof are coincident to each other, and applied onto the optical recording medium 101 as the same spot through an objective lens 50.

Information is recorded by applying only the beam of 458 nm in wavelength, or both beams of 458 nm and 633 nm in wavelength to the optical recording medium 101.

The information is reproduced by simultaneously applying the beams of 458 nm and 633 nm in wavelength to the optical recording medium 101 and detecting change of reflectance of the beam of 633 nm in wavelength reflected by the optical recording medium 101. The beam of 633 nm in wavelength reflected by the optical recording medium 101 is again transmitted through the objective lens 50 and the dichroic mirror 35. Then the beam is converted to a linearly polarized light beam by the quarter-wave plate 45, introduced into the polarized beam splitter 40 as S-polarized light, and reflected by the polarized beam splitter 40. Thereafter the beam reaches a photodetector 60 through a lens 55, to provide a reproduction output.

A non-contact temperature sensor 65 outputs a signal which is based on an environmental temperature around the medium 101, so that a reproduction power control circuit 70 drives the power control units 31a and 31b on the-basis of this signal for controlling power levels of the laser beams. The power control units 31a and 31b are formed by combining Faraday rotators or electro-optic elements (EO elements) with polarizers, for example. Alternatively, no such power control units 31a and 31b may be provided but the outputs of the lasers 30a and 30b may be directly controlled on the basis of the signal from the non-contact temperature sensor 65.

Although the change of the reflectance of the beam of 633 nm in wavelength is detected in order to reproduce the information, that in the beam of 436 nm in wavelength may alternatively be detected.

The wavelengths of the light beams for recording, reproducing and erasing the information and heating the optical recording medium are not restricted to the aforementioned values, but other wavelengths may alternatively be employed.

Although the aforementioned apparatus is provided with two lasers, two beams of different wavelengths may alternatively be obtained using a laser and a wavelength converter such as an SHG element.

A principle of performing multilevel recording of information is now described in relation to the aforementioned nondestructive readout method. An optical recording medium herein employed is identical to that used for the reproduction repetition durability test of Example 1, and it is assumed that a ring-opening state is used as an erased state while a mixed state is used as a recorded state.

When light of a specific wavelength of about 450 nm, for example, is applied to the optical recording medium for partially converting a ring-opening state to a ring-closing state thereby forming a mixed state, it is possible to form mixed states having mixed states having different ratios of ring-opening and ring-closing states for performing multilevel recording of information by controlling the temperature and/or the amount of irradiation of the light. Particularly since there are photostationary states which are specific to respective temperatures, it is preferable to appropriately bring the optical recording medium to a prescribed temperature for forming photostationary states (mixed states) having different ratios of ring-opening and ring-closing states by applying light of around 450 nm in wavelength. In order to set the prescribed temperature, further, it is preferable to appropriately change the amount of irradiation of the light. The amount of irradiation of the light can be appropriately varied with intensity of the light, the irradiation time and the like. Alternatively, another light of 600 nm in wavelengths for example, may be applied in order to control the temperature.

When heating light of about 600 nm in wavelength is applied to the optical recording medium, for example, substantially no heat is generated in the erased portion but the light is converted to heat in the recorded portion, as described above. The amounts of generated heat are varied in the recorded portion since mixed states, i.e., absorbance values are varied in response to multiple levels of information. Namely, since the temperature of the recorded portion is increased as absrobance at the wavelength of the heating light is increased, the rate of change from a ring-opening state to a ring-closing state by irradiation with the light of the specific wavelength is increased.

When the wavelengths and/or amounts of irradiation of the light of a specific wavelength and the heating light are appropriately set for reproducing information by application of the light of the specific wavelength and the heating light, it is possible to balance the change from the ring-opening state to the ring-closing state in each mixed state and reverse reaction in the recorded portion. Further, the erased portion is not changed from a ring-opening state to a ring-closing state since no temperature is increased. Thus, no information is destroyed also in multilevel recording of the information.

The information can be erased by appropriately setting the amount of irradiation of the heating light.

This also applies to a case where the ring-opening state of the optical recording medium is used as a recorded state and a mixed state or a photostationary state, of the photochromic material, which includes ring-opening and ring-closing states, is used as an erased state for reproducing information, as clearly understood from the above description.

An experiment of multilevel recording was made using a recording beam of 458 nm in wavelength, which outputted from an Ar laser, and a heating beam of 633 nm in wavelength, which was outputted from an He-Ne laser. The beams were set to have spot diameters of 2 to 3 $\mu$m respectively. A ring-opening state of the optical recording medium was used as an erased state.

First, reflectance of an erased portion was measured with the beam of 633 nm in wavelength (intensity: 0.5 mW, irradiation time: 10 $\mu$s). Assuming that this reflectance is 100%, that with the beam of 633 nm in wavelength (intensity: 0.5 mW, irradiation time: 10 $\mu$s) after irradiation with the beam of 458 nm in wavelength (intensity: 0.3 mW, irradiation time: 0.1 $\mu$s) at a room temperature of 20° C. was 90%.

Then, the intensity of the beam of 458 nm in wavelength was changed to record information, thereby forming recorded portions of 92%, 95%, 97% and 98.5% in reflectance of the beam of 633 nm in wavelength (intensity: 0.5 mW, irradiation time: 10 $\mu$s).

Thereafter the beam of 458 nm in wavelength (intensity: 0.075 mW, irradiation time: 10 $\mu$s) and the beam of 633 nm in wavelength (intensity: 0.5 mW, irradiation time: 10 $\mu$s) were simultaneously applied to the optical recording medium to reproduce the information from the respective recorded portions and the erased portion. While such reproduction was repeated, reflectance values of the respective recorded portions and the erased portion were hardly changed. Thus, it was possible to perform excellent multilevel recording and reproduction of the information.

Such multilevel recording and reproduction can be easily performed also when the aforementioned recorded and erased states are reversed.

The optical recording medium is not restricted to that employed in Example 1, but those employed in Examples 2 and 3 can also be used for performing multilevel recording and reproduction. In an optical recording medium which causes reversible reaction between states A and B, it is possible to perform multilevel recording and reproduction with a similar principle if at least one of reaction to the state A and that to the state B has temperature dependency while a prescribed wavelength region of one of the states A and B has absolutely (or substantially) no absorption to cause absolutely (or substantially) no reaction between the states in the said wavelength region.

Figure 34:
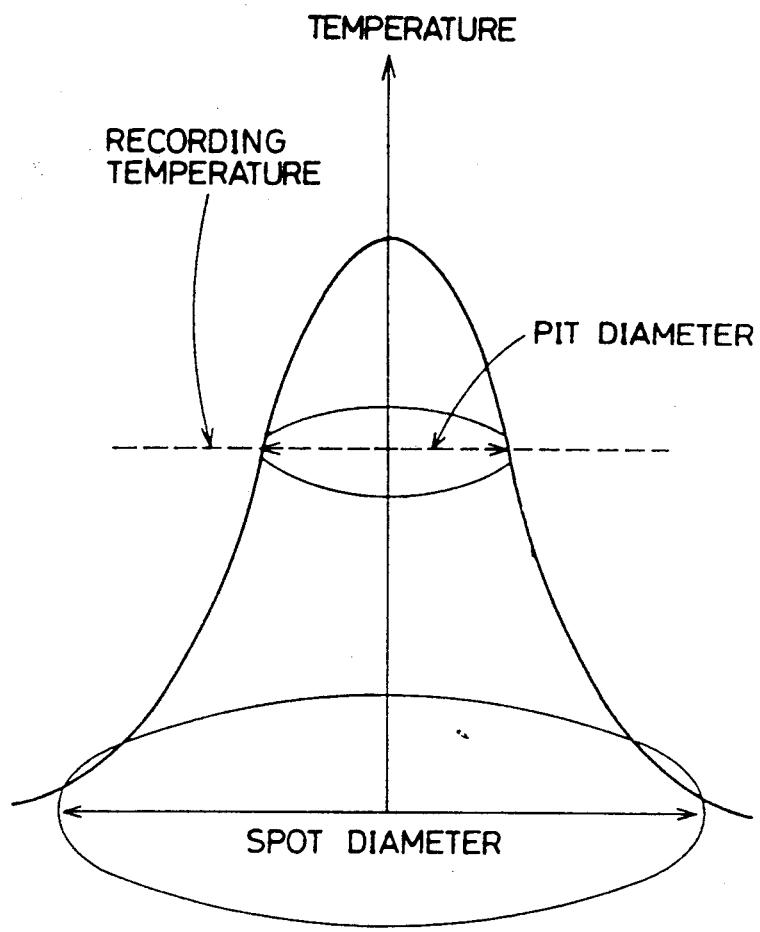
FIG. 34 shows temperature distribution by irradiation of light, for illustrating the relation between a spot and a pit of the light.
Figure 35:
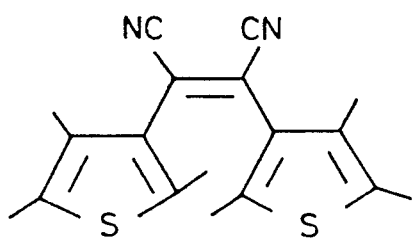
FIG. 35 illustrates the structural formula of a further photochromic material which is employable in the present invention.
Figure 36:
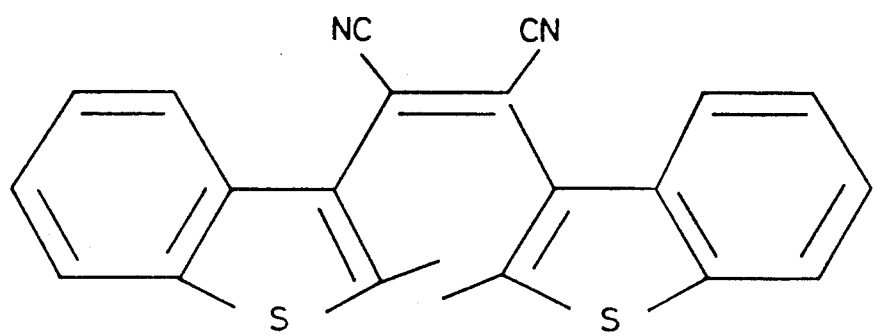
FIG. 36 illustrates the structural formula of a further photochromic material which is employable in the present invention.
Figure 37:
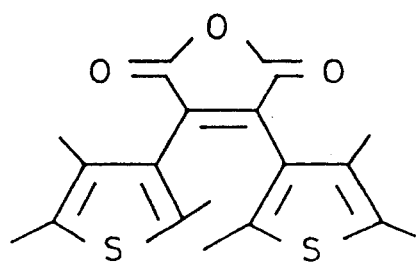
FIG. 37 illustrates the structural formula of a further photochromic material which is employable in the present invention.
Figure 38:
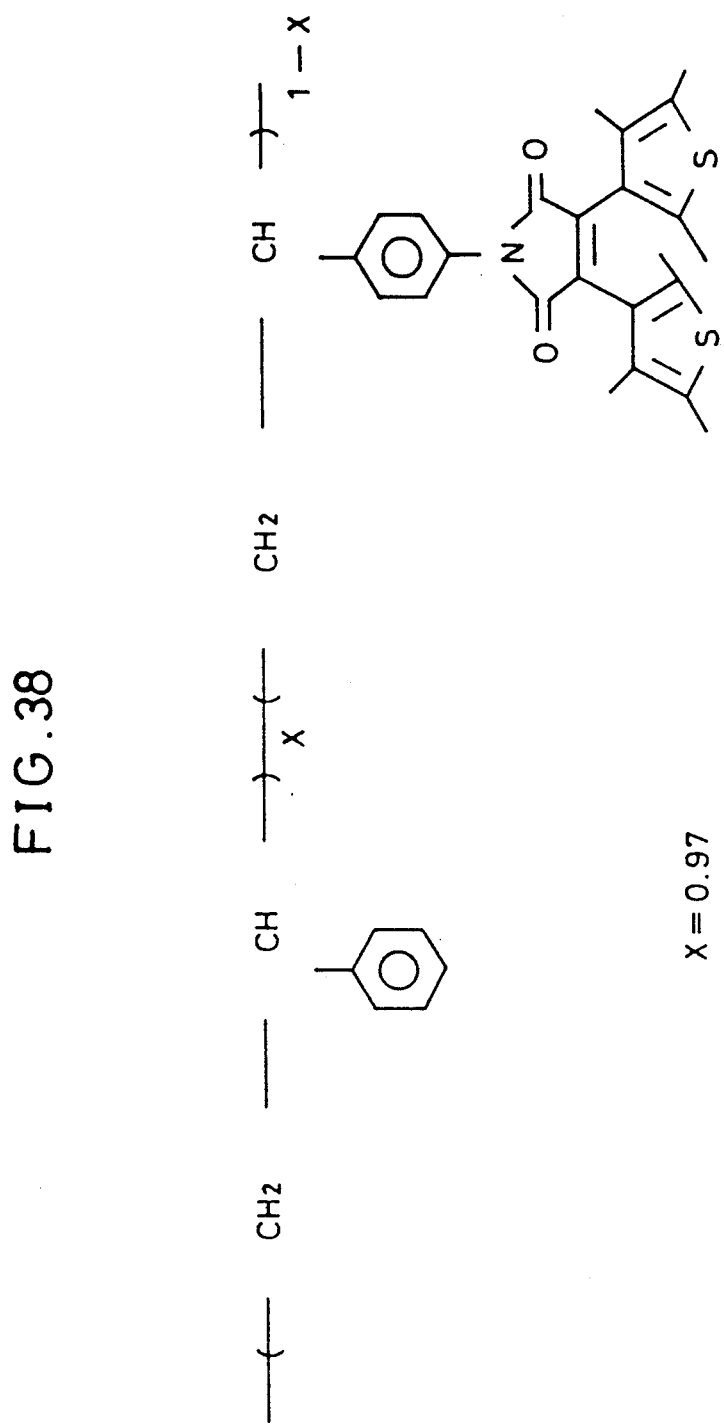
FIG. 38 illustrates the structural formula of a further photochromic material which is employable in the present invention.

It is possible to record or reproduce information in or from such an optical recording medium in high density with a laser beam, since a recording or reproducing pit diameter which is in temperature distribution efficiently facilitating photochemical reaction by irradiation with the laser beam is smaller than the spot diameter of the beam, as shown in FIG. 34.

In the aforementioned Example, the wavelengths of the light for recording, reproducing and erasing information and the heating light are not restricted to the aforementioned values but other wavelengths may also be employed, while light sources may be formed by lasers or the like. The information can be recorded, reproduced or erased in, from or from the optical system shown in FIG. 33, for example. The optical recording medium may be of either a reflection type or a transmission type, and may be applied to either an optical tape or an optical disk. Further, the information can be recorded or reproduced through other optical properties such as optical rotatory power, birefringence, a refractive index and the like.

The optical recording medium having temperature dependency may be provided with the aforementioned properties, while a nondestructive readout operation can be performed also when the medium contains a photochromic material which causes reversible reaction, such as geometrical isomerization reaction, tautomerization reaction, cyclization adding reaction, dissociation reaction, dissociative ring-opening reaction, oxidation-reduction reaction, oxygen adding reaction, radical reaction or the like, between the states A and B, if the same has the aforementioned temperature dependency. The optical recording medium may be either of a reflection type or a transmission type, and may be applied to either an optical tape or an optical disk. Further, the information may be recorded or reproduced through other optical properties such as optical rotatory power, birefringence, a refractive index and the like. The recording layer is preferably provided on its surface with a protective coat of resin such as polyvinyl alcohol, in order to intercept oxygen and the like for preventing the recording layer from deterioration.

The photochromic material employed in the present invention is not restricted to those employed in the aforementioned Examples. For example, the photochromic material may have another substituent. Further, the photochromic material may be prepared from another diarylethene derivative such as that shown in FIG. 24, 25 or 26. A diarylethene derivative containing a benzothiophene ring is particularly effective. Further, a diarylethene derivative containing an acid anhydride is effective. It is also possible to use a thermally stable photochromic material which is not a diarylethene derivative.

Figure 39:
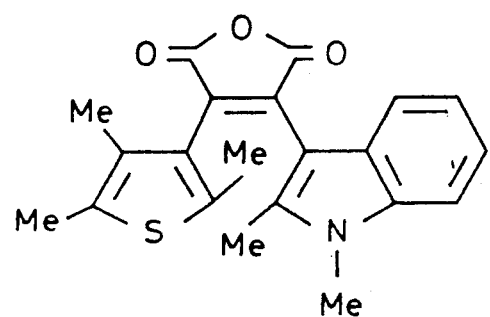
FIG. 39 illustrates the structural formula of a further photochromic material which is employable in the present invention.
Figure 40:
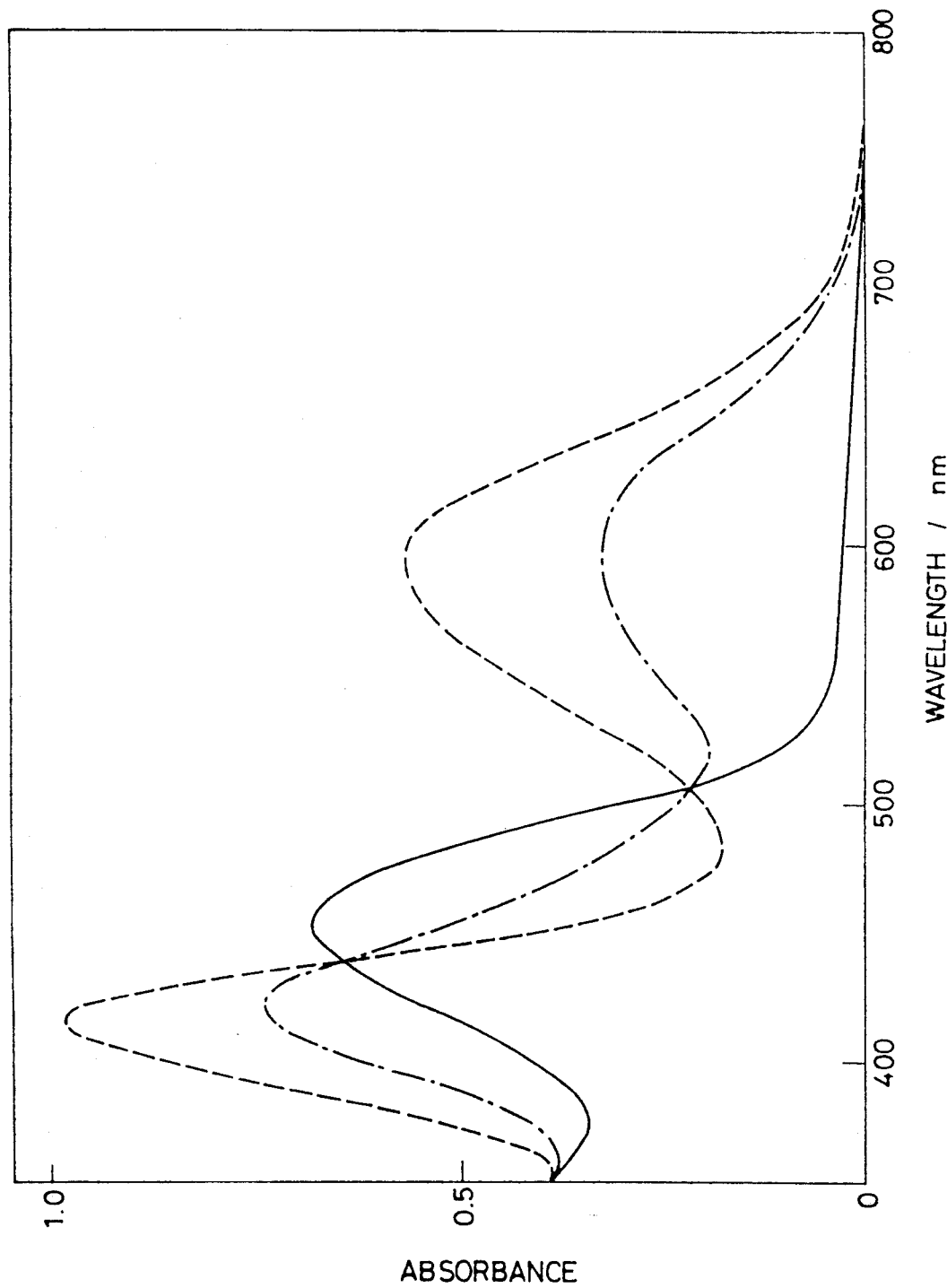
FIG. 40 illustrates absorbance of the photochromic material shown in FIG. 39.

FIG. 39 shows a structural formula of a diarylethene derivative having an indole ring and a thiophene ring. FIG. 40 shows absorbance characteristics of this photochromic material. Ring-opening and ring-closing states of this photochromic compound are so stable that the same are hardly changed by heat.

This photochromic material has absorption in a waveband longer by about 50 nm as compared with the photochromic materials of the aforementioned examples. An optical recording medium having sensitivity in a longer waveband can be obtained by employing such a photochromic material.

Example 6 is now described.

The photochromic material shown in FIG. 39 was dissolved in cyclohexanone, serving as a solvent, with polystyrene having mean molecular weight of 20000, to prepare samples Nos. F-1 to F-3 shown in FIG. 41.

The samples Nos. F-1 to F-3 were applied onto glass substrates by solution casting respectively, and thereafter the solvents were evaporated to form recording layers, thereby preparing optical recording media.

Light of 600 nm in wavelength was applied to the recording layers of these optical recording media to entirely bring the same into ring-opening states, and absorbance values were measured. Then, light of 480 nm in wavelength was applied to the portions irradiated with the light, to bring the same into photostationary states, and thereafter absorbance values were measured, to calculate conversion yields of closed-ring forms. This calculation was made through the following expression:

$$Z = C_B/C_O \times 100$$

where $C_O$ is equal to $E_1/\epsilon_1$, and $C_B$ is equal to $E_2/\epsilon_2$.

$C_O$ represents initial concentration (mol$\lambda$/l) in a 100% ring-opening state, $C_B$ represents closed-ring form concentration (mol$\lambda$/l) in a photostationary state, $E_1$ represents absorbance at a peak wavelength of the ring-opening state, $\epsilon_1$ represents absorptivity (1/mol$\lambda$.cm) of the ring-opening state at the peak wavelength, $E_2$ represents absorbance of the ring-closing state at the peak wavelength, and $\epsilon_2$ represents an absorptivity (1/mol$\lambda$.cm) of the ring-closing state at the peak wavelength.

Temperature dependency values of the conversion yields of closed-ring form of the samples Nos. F-1 to F-3 were measured. The results are shown in FIG. 42.

Figure 42:
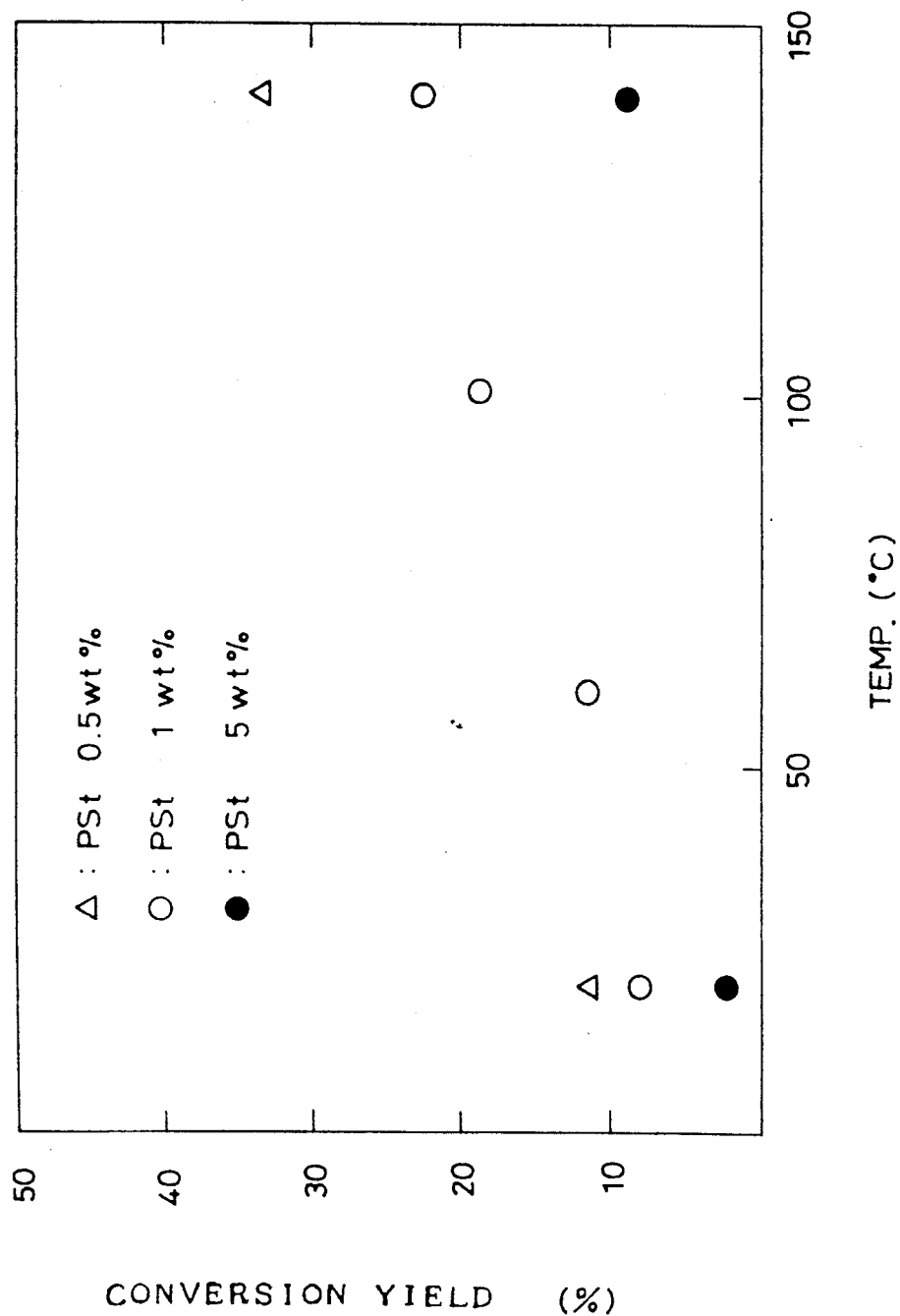
FIG. 42 illustrates temperature dependency values of conversion yields in example 6.

It is clearly understood from FIG. 42 that the conversion yields of closed-ring form formation ratio is increased by increasing the temperature of the optical recording medium. Namely, it is understood that reaction from the ring-opening state to the ring-closing state is extremely easily caused in the photochromic compound.

This is conceivably because the polymer is locally relaxed with temperature rise, to easily cause reaction, which has been suppressed by steric hindrance or the like.

It is also understood from FIG. 42 that temperature dependency of the conversion yields of closed-ring form is increased when the mixing ratio of the photochromic compound to the polymer is small.

The information was reproduced by applying two beams of different wavelengths, using the optical system shown in FIG. 11. An optical recording medium was prepared by forming an A$\lambda$ reflective layer on a glass substrate in a thickness of about 2000 Å by vacuum deposition, and forming a recording layer with a solution of the sample No. F-2 in the aforementioned manner. The thickness of the recording layer was about 20 $\mu$m.

In the optical system, the apparatus 2a was formed by an Ar ion laser for outputting a linearly polarized pulse laser beam of 488 nm in wavelength. The apparatus 2b was formed by an He-Ne laser for outputting a linearly polarized pulse laser beam of 633 nm in wavelength.

Figure 43:
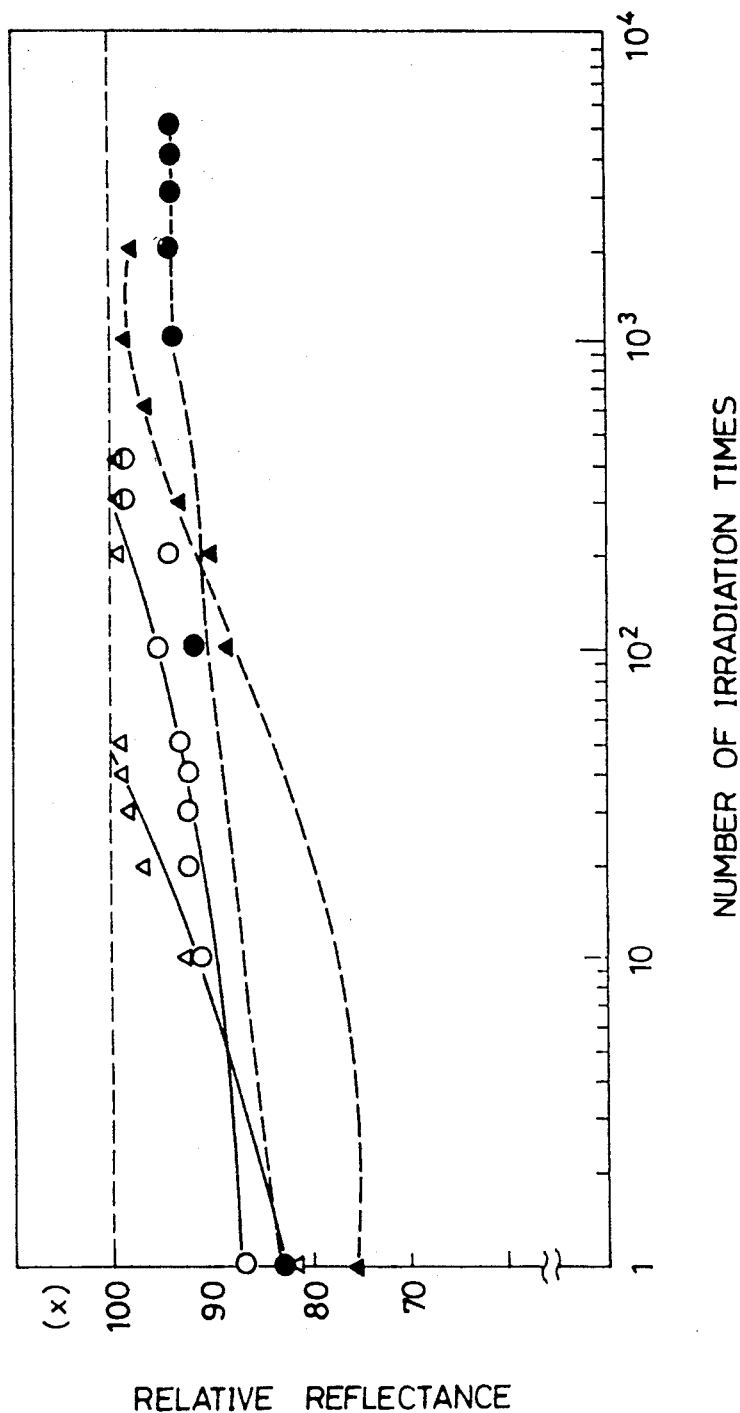
FIG. 43 illustrates results of repetition durability in Example 6.

Relative reflectance was measured with the He-Ne laser beam, on the assumption that the value in a ring-opening state was 100%. The information was reproduced by simultaneously applying the two beams of different wavelengths, with two types of power ratios. FIG. 43 shows the results. Referring to FIG. 43, black triangles show the results of measurement which was made under conditions of 488 nm—0.8 mW and 633 nm—0.5 mW. Black circles show the results of measurement which was made under conditions of 488 nm—0.2 mW and 633 nm—0.2 mW. The beams were applied in a recorded state (photostationary state) by 10 $\mu$s every pulse, at intervals of 10 ms.

Referring to FIG. 43, white circles show the results of measurement which was made with independent irradiation of 633 nm—0.2 mW, and white triangles show the results of measurement which was made with independent irradiation of 633 nm—0.5 mW.

Example 7 is now described.

Figure 45:
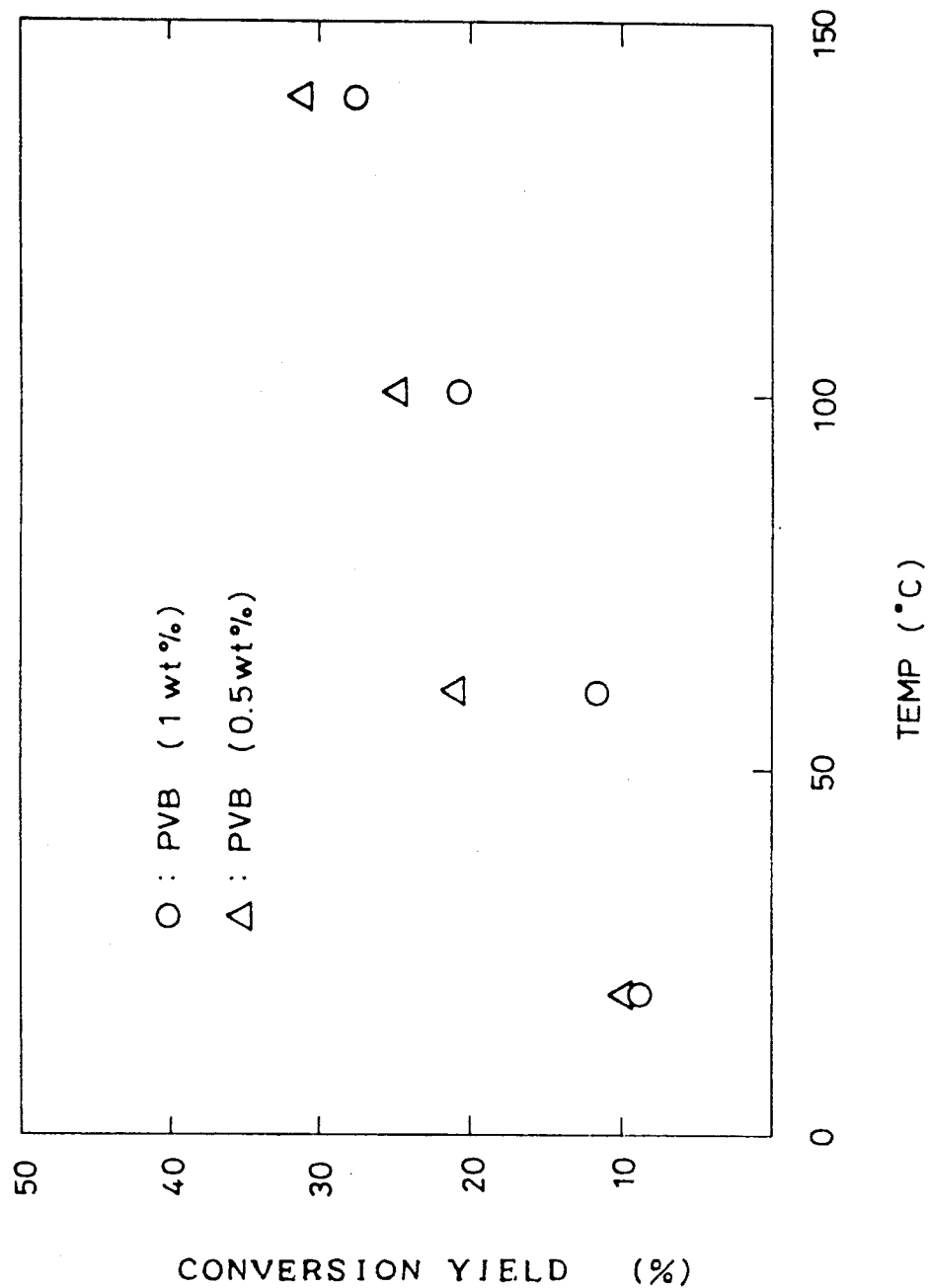
FIG. 45 illustrates conversion yields in Example 7.

The same photochromic material as Example 6 was employed and similar evaluation was made with a different polymer, which was prepared from polyvinyl butyral in place of polystyrene. FIG. 44 shows mixing ratios of the photochromic material to polyvinyl butyral. Optical recording media were prepared similarly to Example 6, and temperature dependency values of conversion yields of closed-ring form were measured. FIG. 45 shows the results.

Figure 47:
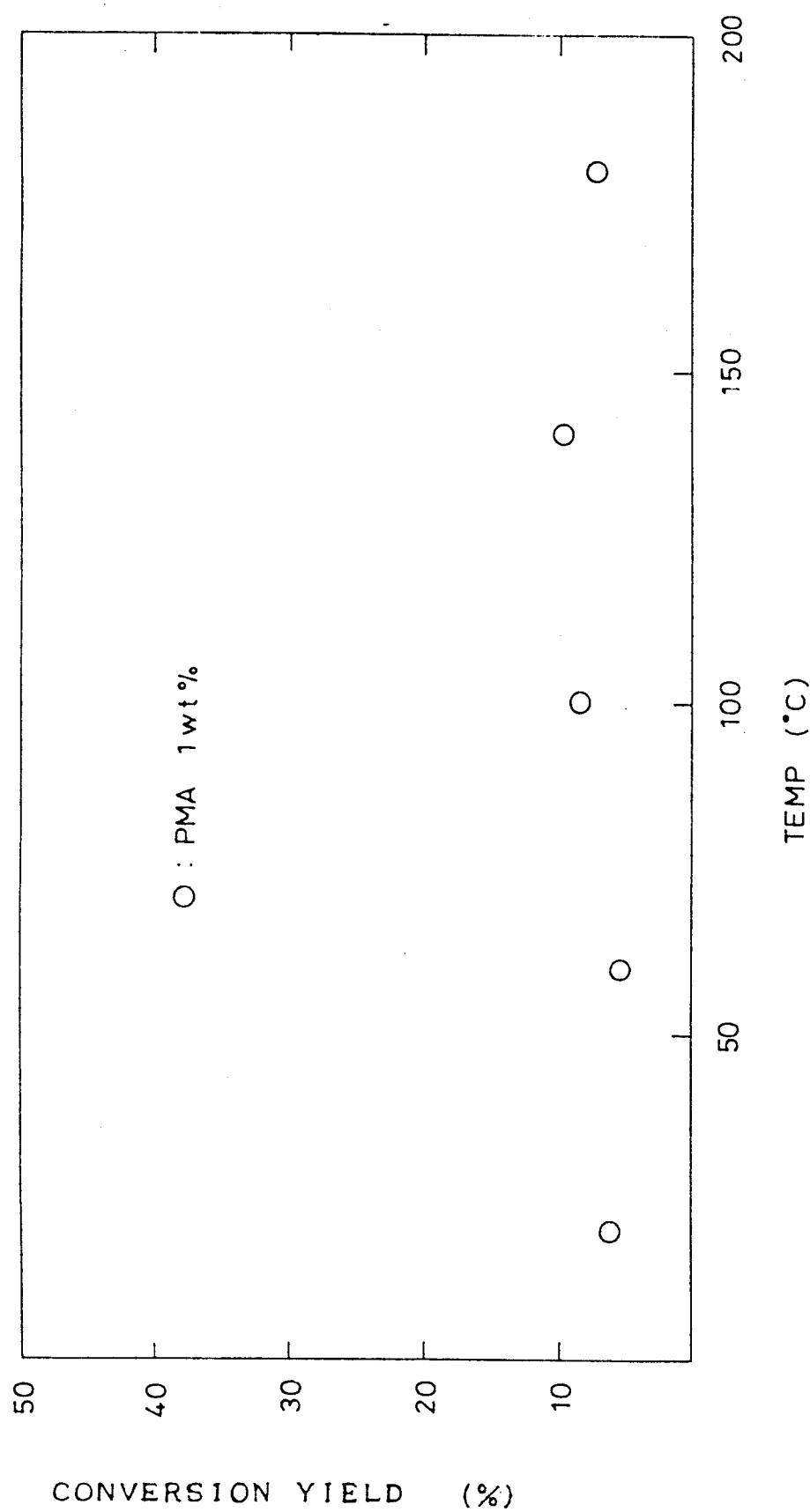
FIG. 47 illustrates temperature dependency of a conversion yields in combination of the photochromic material shown in FIG. 39 and polymethacrylic acid.
Figure 48:
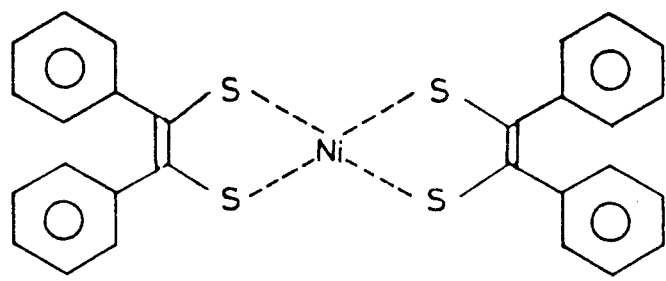
FIG. 48 illustrates the structural formula of a singlet oxygen quencher which is employable in the present invention.

Comparative example was prepared by employing polymethacrylic acid as a polymer, in place of the polymers of Examples 6 and 7. FIG. 46 shows the mixing ratio of a photochromic material to the polymethacrylic acid. FIG. 47 shows temperature dependency of a conversion yield of closed-ring form in the combination of the photochromic material and the polymethacrylic acid.

As understood from FIG. 47, this combination of the photochromic material and the polymethacrylic acid exhibited no temperature dependency.

Example of a recording layer containing a singlet oxygen quencher is now described.

A photochromic material was prepared from that shown in FIG. 1. 1 part by weight of the photochromic material, 0.1 parts by weight of a singlet oxygen quencher and 100 parts by weight of polymethacrylic acid were mixed with each other and this mixture was mixed with/dissolved in 1000 parts by weight of methyl cellosolve, serving as a solvent, to form a recording layer by solution casting. As shown in FIG. 51, an Aλ reflective layer 2 was formed on a glass substrate 1 of 50 mm by 50 mm by vacuum deposition in a thickness of about 2000 Å, to form a recording medium. A recording layer 3 of the aforementioned composition was formed on the reflective layer 2, in a thickness of about 20 μm.

A beam of 458 nm in wavelength outputted from an Ar ion laser was used as recording light, and a beam of 633 nm in wavelength outputted from an He-Ne laser was used as erasing light, with spot diameters of about 2 to 3 μm. The He-Ne laser beam, serving as an erasing laser beam, was applied with power of 0.85 mW for 10 μs, while the Ar ion laser beam, serving as a recording laser beam, was applied with power of 0.90 mW for 100 μs. Such erasing and recording were counted as one, and the number of repeatable times was measured in relation to reduction by 50% with respect to initial change. Reflectance was measured after application of the recording beam by applying the He-Ne laser beam of the same power for 1 μs. As the result, recording was about 50 to 70% with respect to a photostationary state, and it is conceivable that information was completely erased.

The number of repeatable times was 160,000.

Figure 49:
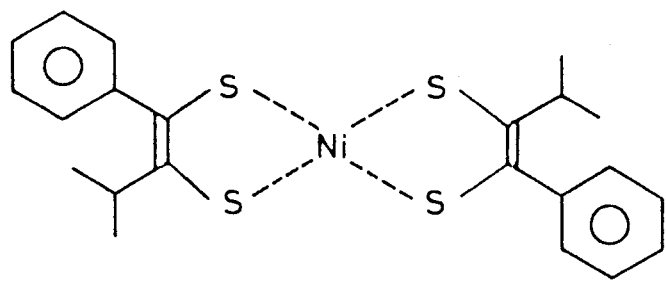
FIG. 49 illustrates the structural formula of another singlet oxygen quencher which is employable in the present invention.

Then the singlet oxygen quencher was replaced by that having a structural formula shown in FIG. 49, and the number of repeatable times was measured in a similar manner to the above. The result was 100,000.

Figure 50:
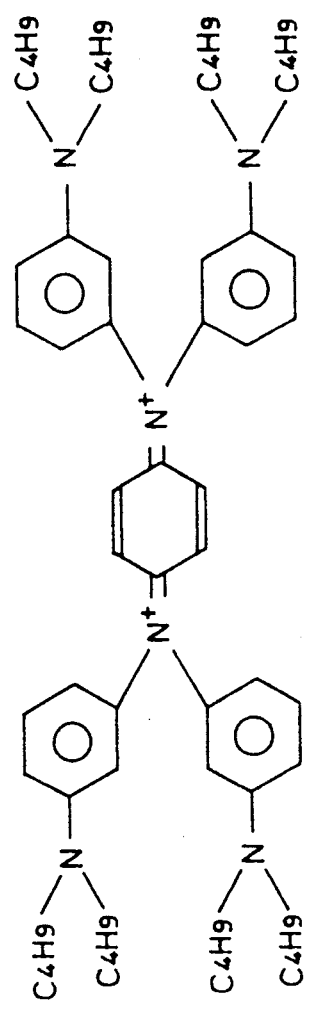
FIG. 50 illustrates the structural formula of still another singlet oxygen quencher which is employable in the present invention.

The singlet oxygen quencher was further replaced by that having a structural formula shown in FIG. 50, and the number of repeatable times was measured similarly to the above. The result was 130,000.

For the purpose of comparison, a recording layer was formed with no addition of a singlet oxygen quencher, and the number of repeatable times was measured. The result was 60,000.

As understood from the above, it is possible to improve repeat durability by adding a singlet oxygen quencher to a recording layer according to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for reproducing information recorded in an optical recording medium having recorded states, comprising the steps of:
   selectively heating a portion of a photochromic recording layer of the optical recording medium which is in a photostationary state;
   additionally applying a reproducing light to said photochromic recording layer;
   at least a portion of said light passing through said photochromic recording layer; and
   detecting said reproducing light which is passed through said photochromic recording layer; whereby reproducing recorded states.

2. A method for reproducing information recorded in an optical recording medium in accordance with claim 1, wherein said heating step comprises applying light of a wavelength which is absorbed only by a portion of said recording layer being in a photostationary state in an amount sufficient to heat said recording layer.

3. A method for reproducing information recorded in an optical recording medium in accordance with claim 1, wherein said reproducing light is applied to said heated portion of said recording layer thereby maintaining said photostationary state of said portion of said recording layer.

4. A method for reproducing information recorded in an optical recording medium in accordance with claim 1, wherein said polymer contained in said recording layer has strong intermolecular interaction with respect to said photochromic material.

5. A method for recording information at multilevels in an optical recording medium, comprising the steps of:
   heating a recording layer, containing a photochromic material and a polymer, which are so combined with each other that a photostationary state, attained upon irradiation with light of a specific wavelength, is variable with temperatures, to a temperature corresponding to each level; and
   applying said light of a specific wavelength to said heated recording layer for bringing the same into a photostationary state corresponding to said temperature.

6. A method for recording information at multilevels in an optical recording medium in accordance with claim 5, including heating said recording layer to said temperature corresponding to each level by changing the amount of irradiation of said light of specific wavelength.

7. A method for reproducing information recorded at multilevels in an optical recording medium, comprising the steps of:
   selectively heating a portion of a photochromic recording layer, which is in a photostationary state corresponding to each level, to a temperature corresponding to each level; and
   additionally applying a reproducing light to said photochromic recording layer,
   at least some of said light passing through said photochromic recording layer.

8. A method for reproducing information recorded at multilevels an optical recording medium in accordance with claim 7, wherein said heating steps comprises applying light of a wavelength which is absorbed only by a portion of said recording layer which is in a photostationary state in an amount sufficient to heat said recording layer.

9. A method for reproducing information recorded at multilevels in an optical recording medium in accordance with claim 7, wherein said reproducing light is applied to said portion of said recording layer which is heated to said temperature corresponding to each level thereby maintaining said portion of said recording layer in a photostationary state corresponding to each level.

10. A method for recording information in an optical recording medium comprising the steps of:
applying heating light to a part of a recording layer, containing a photochromic material and a polymer, which material and polymer are so combined with each other that a photostationary stat attainable upon irradiation with light of a specific wavelength, is varied with temperatures, in an amount sufficient for heating the same; and
applying said light of a specific wavelength particularly overlapping with a region of said heated part of said recording layer whereby recording information.

11. A method for reproducing information in an optical recording medium comprising the steps of:
applying heating light to a recording layer, containing a photochromic material and a polymer, which material and polymer are so combined with each other that a photostationary state attainable upon irradiation with light of a specific wavelength is varied with temperatures, with relative movement for heating the same; and
applying said light of a specific wavelength to said recording layer with relative movement following said heating light for reproducing a part of said recording layer being heated by said heating light.

* * * * *

UNITED STATES PATENT AND TRADEMARK OFFICE
CERTIFICATE OF CORRECTION

PATENT NO. : 5,281,501

DATED : January 25, 1994

INVENTOR(S) : TATEZONO et al.

It is certified that error appears in the above-indentified patent and that said Letters Patent is hereby corrected as shown below:

Title page,

[75] line 1-2, change "Irie Masahiro" to

-- Masahiro Irie --.

Signed and Sealed this

Twenty-third Day of January, 1996

Attest:

BRUCE LEHMAN

*Attesting Officer*   *Commissioner of Patents and Trademarks*